United States Patent
Liu et al.

(10) Patent No.: US 11,252,602 B2
(45) Date of Patent: Feb. 15, 2022

(54) WIRELESS COMMUNICATION METHOD AND DEVICE

(71) Applicant: Huawei Technologies Co., Ltd., Shenzhen (CN)

(72) Inventors: Xing Liu, Shenzhen (CN); Chong Lou, Shanghai (CN); Qufang Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 65 days.

(21) Appl. No.: 16/503,241

(22) Filed: Jul. 3, 2019

(65) Prior Publication Data

US 2019/0327638 A1 Oct. 24, 2019

Related U.S. Application Data

(63) Continuation of application No. PCT/CN2017/114773, filed on Dec. 6, 2017.

(30) Foreign Application Priority Data

Jan. 4, 2017 (CN) .......................... 201710005001.9

(51) Int. Cl.
*H04W 28/04* (2009.01)
*H04L 1/18* (2006.01)
*H04W 48/12* (2009.01)

(52) U.S. Cl.
CPC .......... *H04W 28/04* (2013.01); *H04L 1/1812* (2013.01); *H04L 1/1825* (2013.01);
(Continued)

(58) Field of Classification Search
CPC ..... H04L 5/001; H04L 1/1812; H04L 1/1825; H04L 1/1896; H04L 1/1864;
(Continued)

(56) References Cited

U.S. PATENT DOCUMENTS

2009/0180427 A1 7/2009 Kuo
2015/0009832 A1 1/2015 Dalsgaard et al.
(Continued)

FOREIGN PATENT DOCUMENTS

CN 101730206 A 6/2010
CN 104468030 A 3/2015
(Continued)

OTHER PUBLICATIONS

"MAC impacts of asynchronous HARQ for BL UEs and UEs in EC," 3GPP TSG-RAN WG2#93, St. Julian's, Malta, Tdoc R2-161689, total 13 pages, 3rd Generation Partnership Project, Valbonne, France (Feb. 15-19, 2016).

(Continued)

*Primary Examiner* — Vinncelas Louis
(74) *Attorney, Agent, or Firm* — Leydig, Voit & Mayer, Ltd.

(57) ABSTRACT

A terminal device flexibly configures a time length of a first timer (a downlink hybrid automatic repeat request (HARQ) round trip time timer or an uplink HARQ round trip time timer) based on different application scenarios. A wireless communication method includes: obtaining feature information of a first air interface format and/or feature information of first transmission data; and determining a time length of a first timer based on the feature information of the first air interface format and/or the feature information of the first transmission data, where the first timer is used to indicate that monitoring a physical downlink control channel (PDCCH) is not required within the time length of the first timer.

18 Claims, 16 Drawing Sheets

(52) U.S. Cl.
CPC .......... *H04L 1/1851* (2013.01); *H04L 1/1883* (2013.01); *H04W 48/12* (2013.01)

(58) Field of Classification Search
CPC ... H04L 1/1851; H04L 1/1883; H04L 1/1829; H04L 1/1848; H04L 1/1867; H04W 28/04; H04W 24/08; H04W 48/12; H04W 52/02; H04W 52/0216
See application file for complete search history.

(56) References Cited

U.S. PATENT DOCUMENTS

| | | | | |
|---|---|---|---|---|
| 2018/0376439 | A1* | 12/2018 | Urabayashi | ............. H04L 5/001 |
| 2019/0327639 | A1* | 10/2019 | Huang | ................... H04L 1/188 |

FOREIGN PATENT DOCUMENTS

| | | |
|---|---|---|
| CN | 106162919 A | 11/2016 |
| EP | 2152040 A1 | 2/2010 |
| EP | 3300434 A1 | 3/2018 |
| JP | 2011520378 A | 7/2011 |
| JP | 2015039211 A | 2/2015 |
| JP | 2018517375 A | 6/2018 |
| WO | 2016197366 A1 | 12/2016 |

OTHER PUBLICATIONS

"DRX for sTTI," 3GPP TSG-RAN WG2 Meeting #96, Reno, Nevada, USA, R2-168008, pp. 1-3, 3rd Generation Partnership Project, Valbonne, France (Nov. 14-18, 2016).

"DRX with Multiple Numerologies," 3GPP TSG-RAN WG2 Meeting #96, Reno, Nevada, USA, R2-167576, pp. 1-2, 3rd Generation Partnership Project, Valbonne, France (Nov. 14-18, 2016).

"DRX during UL scheduling," 3GPP TSG-RAN WG2 #79bis, Bratislava, Slovakia, R2-124962, pp. 1-8, 3rd Generation Partnership Project, Valbonne, France (Oct. 8-12, 2012).

Ericsson, "Impact of sTTI on MAC timers and DRX," 3GPP TSG-RAN WG2 #96, Nevada, US, Tdoc R2-168626, total 7 pages, 3rd Generation Partnership Project, Valbonne, France (Nov. 14-18, 2016).

* cited by examiner

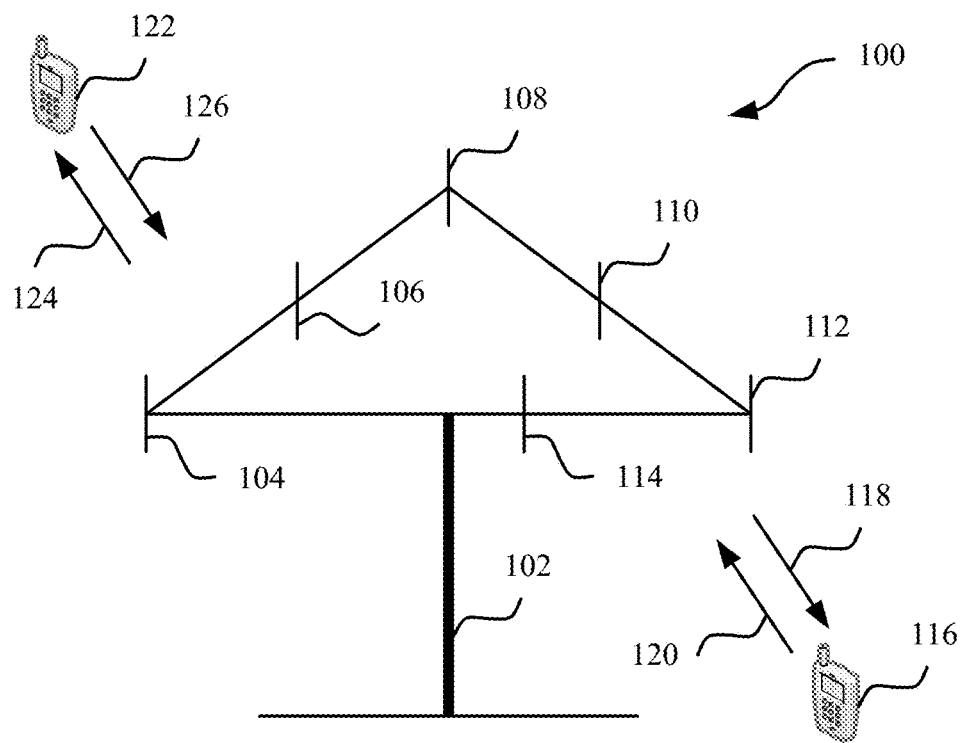

201. Obtain feature information of a first air interface format and/or feature information of first transmission data 202. Determine a time length of a first timer based on the feature information of the first air interface format and/or the feature information of the first transmission data, where the first timer is used to indicate that monitoring a downlink control channel PDCCH is not required within the time length of the first timer

201. Obtain feature information of a first air interface format and/or feature information of first transmission data 202. Determine a time length of a first timer based on the feature information of the first air interface format and/or the feature information of the first transmission data, where the first timer is used to indicate that monitoring a downlink control channel PDCCH is not required within the time length of the first timer 203. Obtain feature information of a second air interface format 204. Determine a time length of a second timer based on the feature information of the second air interface format, where the second timer is started when the first timer expires, and the second timer is used for monitoring the downlink control channel PDCCH to obtain control information that indicates retransmission of the first transmission data

310. Obtain feature information of a first air interface format and/or feature information of first transmission data 320. Determine a time length of a first timer based on the feature information of the first air interface format and/or the feature information of the first transmission data, where the first timer is used to indicate that monitoring a downlink control channel PDCCH is not required within the time length of the first timer

410. Obtain feature information of a first air interface format

420. Determine a time length of a first timer based on the feature information of the first air interface format, where the first timer is started when a second timer expires, the first timer is used for monitoring a downlink control channel PDCCH to obtain control information that indicates retransmission of first transmission data, and the second timer is used to indicate that monitoring the downlink control channel PDCCH is not required within the time length of the first timer

FIG. 16

WIRELESS COMMUNICATION METHOD AND DEVICE

CROSS-REFERENCE TO RELATED APPLICATIONS

This application is a continuation of International Application No. PCT/CN2017/114773, filed on Dec. 6, 2017, which claims priority to Chinese Patent Application No. 201710005001.9, filed on Jan. 4, 2017. The disclosures of the aforementioned applications are hereby incorporated by reference in their entireties.

TECHNICAL FIELD

Embodiments of this application relate to the communications field, and more specifically, to a wireless communication method and device.

BACKGROUND

In a wireless communications system, a hybrid automatic repeat request (HARQ) manner is usually used for error control due to a time-varying characteristic of a wireless channel and impact from multipath fading to signal transmission. In a Long-Term Evolution (LTE) system, generally, N different HARQ processes exist in parallel. For each HARQ process, a time interval between first data transmission and earliest next transmission is a minimum HARQ round trip time (RTT). To allow a terminal device (UE) to sleep in a HARQ RTT period, a HARQ round trip time timer is defined for each downlink HARQ process and is started in a subframe in which the UE receives a physical downlink control channel (PDCCH) that indicates downlink transmission or in a last subframe in which the UE receives downlink data. For an uplink asynchronous HARQ, an uplink HARQ round trip time timer is defined for each uplink HARQ process and is started in the last subframe in which the UE sends uplink data.

In an LTE frequency division duplex (FDD) system, a time length of the HARQ round trip time timer is fixedly eight subframes, and a time length of the uplink HARQ round trip time timer is fixedly four subframes.

However, the HARQ round trip time timer with the fixed time length and the uplink HARQ round trip time timer with the fixed time length cannot meet requirements of different application scenarios. For example, a timer with a shorter time length needs to be used in a delay-sensitive scenario, so that the UE wakes up as soon as possible to receive data; and a timer with a longer time length needs to be used in a delay-insensitive scenario.

Therefore, a HARQ round trip time timer with a configurable time length and an uplink HARQ round trip time timer with a configurable time length are urgent to be provided, to flexibly adapt to different application scenarios.

SUMMARY

Embodiments of this application provide a wireless communication method and device, so that a first timer (a downlink HARQ round trip time timer or an uplink HARQ round trip time timer) and a second timer (an uplink retransmission timer or a downlink retransmission timer) can be flexibly configured based on different application scenarios.

According to a first aspect, a wireless communication method is provided, including: obtaining feature information of a first air interface format and/or feature information of first transmission data; and determining a time length of a first timer based on the feature information of the first air interface format and/or the feature information of the first transmission data, where the first timer is used to indicate that monitoring a downlink control channel (e.g., a physical downlink control channel (PDCCH)) is not required within the time length of the first timer.

Optionally, the first timer may be an uplink HARQ round trip time timer or a downlink HARQ round trip time timer.

Optionally, the first timer is started when the first transmission data is sent or received.

Optionally, the first timer is started when a PDCCH is received, where the PDCCH is a PDCCH that indicates transmission of the first transmission data or indicates retransmission of the first transmission data.

Optionally, the first transmission data may be uplink data or downlink data.

Therefore, in an embodiment of this application, a terminal device can flexibly configure the time length of the first timer based on feature information of an air interface format used in a data transmission process and/or feature information of transmission data.

Optionally, in an implementation of the first aspect, the method further includes: obtaining feature information of a second air interface format, where the second air interface format is the same as or different from the first air interface format; and determining a time length of a second timer based on the feature information of the second air interface format, where the second timer is started when the first timer expires, and the second timer is used for monitoring the downlink control channel (e.g., a PDCCH) to obtain control information that indicates retransmission of the first transmission data.

Optionally, the second timer may be an uplink retransmission timer or a downlink retransmission timer.

Therefore, in an embodiment of this application, a terminal device can flexibly configure the time length of the second timer based on feature information of an air interface format used in a data transmission process.

Optionally, in an implementation of the first aspect, the feature information of the first transmission data includes a size of a transport block included in the first transmission data and/or channel bandwidth occupied by the first transmission data.

Optionally, in an implementation of the first aspect, the feature information of the first air interface format includes at least one of the following: a subcarrier spacing and a cyclic prefix length.

Optionally, in an implementation of the first aspect, the feature information of the second air interface format includes at least one of the following: a subcarrier spacing and a cyclic prefix length.

Optionally, in an implementation of the first aspect, the first air interface format is an air interface format used for transmitting PDCCH signaling, where the PDCCH signaling is used to indicate the first transmission data; the first air interface format is an air interface format used for transmitting the first transmission data; the first air interface format is an air interface format used for transmitting PDCCH signaling, where the PDCCH signaling is used to indicate retransmission of the first transmission data; the first air interface format is an air interface format used for retransmitting the first transmission data; or the first air interface format is an air interface format preset for determining the time length of the first timer.

Optionally, in an implementation of the first aspect, the second air interface format is an air interface format used for transmitting PDCCH signaling, where the PDCCH signaling is used to indicate the first transmission data; the second air interface format is an air interface format used for transmitting the first transmission data; the second air interface format is an air interface format used for transmitting PDCCH signaling, where the PDCCH signaling is used to indicate retransmission of the first transmission data; the second air interface format is an air interface format used for retransmitting the first transmission data; or the second air interface format is an air interface format preset for determining the time length of the second timer.

Optionally, in an implementation of the first aspect, the method further includes: receiving first indication information sent by a network device, where the first indication information is used to indicate at least one of the following correspondences: a correspondence between an air interface format and a time length of a timer, a correspondence between transmission data and a time length of a timer, and a correspondence between a time length of a timer and a combination of an air interface format and transmission data; and the determining a time length of a first timer based on the feature information of the first air interface format and/or the feature information of the first transmission data includes: determining the time length of the first timer based on the correspondence indicated by the first indication information and at least one of the first air interface format and the feature information of the first transmission data.

Optionally, the first indication information is further used to indicate at least one of the following correspondences: a correspondence between the first air interface format and the time length of the first timer, a correspondence between the first transmission data and the time length of the first timer, and a correspondence among the time length of the first timer, the first air interface format, and the first transmission data; and the determining a time length of a first timer based on the feature information of the first air interface format and/or the feature information of the first transmission data includes: determining the time length of the first timer based on the correspondence indicated by the first indication information and at least one of the first air interface format and the feature information of the first transmission data.

Optionally, the first indication information is further used to directly specify a time length of a timer; and the determining a time length of a first timer based on the feature information of the first air interface format and/or the feature information of the first transmission data includes: determining the time length of the first timer based on the timer time length specified by the first indication information.

Optionally, in an implementation of the first aspect, the determining a time length of a first timer based on the feature information of the first air interface format and/or the feature information of the first transmission data includes: when second indication information is not received, determining the time length of the first timer based on the correspondence indicated by the first indication information and the at least one of the first air interface format and the feature information of the first transmission data, where the second indication information is carried by PDCCH signaling and is used to indicate at least one of the following correspondences: a correspondence between the first air interface format and the time length of the first timer and a correspondence between the feature information of the first transmission data and the time length of the first timer.

Optionally, in an implementation of the first aspect, before the determining a time length of a first timer, the method further includes: receiving PDCCH signaling, where the PDCCH signaling indicates the first transmission data and carries second indication information, and the second indication information indicates at least one of the following correspondences: a correspondence between the first air interface format and the time length of the first timer and a correspondence between the feature information of the first transmission data and the time length of the first timer; and the determining a time length of a first timer based on the feature information of the first air interface format and/or the feature information of the first transmission data includes: determining the time length of the first timer based on the correspondence indicated by the second indication information and the at least one of the first air interface format and the feature information of the first transmission data.

Optionally, in an implementation of the first aspect, the method further includes: receiving third indication information sent by a network device, where the third indication information is used to indicate a correspondence between an air interface format and a time length of a timer used for monitoring the downlink control channel (e.g., a PDCCH); and the determining a time length of a second timer based on the feature information of the second air interface format includes: determining the time length of the second timer based on the correspondence indicated by the third indication information and the second air interface format.

Optionally, in an implementation of the first aspect, the determining a time length of a second timer based on the feature information of the second air interface format includes: when fourth indication information is not received, determining the time length of the second timer based on the correspondence indicated by the third indication information and the second air interface format, where the fourth indication information is carried by PDCCH signaling and is used to indicate a correspondence between the second air interface format and the time length of the second timer.

Optionally, in an implementation of the first aspect, before the determining a time length of a second timer, the method further includes: receiving PDCCH signaling, where the PDCCH signaling indicates the first transmission data and carries fourth indication information, and the fourth indication information is used to indicate a correspondence between the second air interface format and the time length of the second timer; and the determining a time length of a second timer based on the feature information of the second air interface format includes: determining the time length of the second timer based on the correspondence indicated by the fourth indication information and the second air interface format.

Optionally, in an implementation of the first aspect, the first timer uses any one of the following units: a millisecond, a microsecond, a transmission time interval (TTI) of the first air interface format, a slot of the first air interface format, a mini-slot of the first air interface format, and a subframe of the first air interface format.

Optionally, in an implementation of the first aspect, the second timer uses any one of the following units: a millisecond, a microsecond, a transmission time interval (TTI) of the second air interface format, a slot of the second air interface format, a mini-slot of the second air interface format, and a subframe of the second air interface format.

According to a second aspect, a wireless communication method is provided, including: obtaining feature information of a first air interface format and/or feature information of first transmission data; and determining a time length of a first timer based on the feature information of the first air interface format and/or the feature information of the first transmission data, where the first timer is used to indicate that monitoring a downlink control channel (e.g., a PDCCH) is not required within the time length of the first timer.

Optionally, the first timer may be an uplink HARQ round trip time timer or a downlink HARQ round trip time timer.

Optionally, the first timer is started when the first transmission data is sent or received.

Optionally, the first timer is started when a PDCCH is received, where the PDCCH is a PDCCH that indicates transmission of the first transmission data or indicates retransmission of the first transmission data.

Optionally, the first transmission data may be uplink data or downlink data.

Therefore, in an embodiment of this application, a terminal device can flexibly configure the time length of the first timer (an uplink HARQ round trip time timer or a downlink HARQ round trip time timer) based on feature information of an air interface format used in a data transmission process and/or feature information of transmission data.

Optionally, in an implementation of the second aspect, the feature information of the first transmission data includes a size of a transport block of the first transmission data and/or channel bandwidth occupied by the first transmission data.

Optionally, in an implementation of the second aspect, the feature information of the first air interface format includes at least one of the following: a subcarrier spacing and a cyclic prefix length.

Optionally, in an implementation of the second aspect, the first air interface format is an air interface format used for transmitting PDCCH signaling, where the PDCCH signaling is used to indicate the first transmission data; the first air interface format is an air interface format used for transmitting the first transmission data; the first air interface format is an air interface format used for transmitting PDCCH signaling, where the PDCCH signaling is used to indicate retransmission of the first transmission data; the first air interface format is an air interface format used for retransmitting the first transmission data; or the first air interface format is an air interface format preset for determining the time length of the first timer.

Optionally, in an implementation of the second aspect, the method further includes: receiving first indication information sent by a network device, where the first indication information is used to indicate at least one of the following correspondences: a correspondence between an air interface format and a time length of a timer, a correspondence between transmission data and a time length of a timer, and a correspondence between a time length of a timer and a combination of an air interface format and transmission data; and the determining a time length of a first timer based on the feature information of the first air interface format and/or the feature information of the first transmission data includes: determining the time length of the first timer based on the correspondence indicated by the first indication information and at least one of the first air interface format and the feature information of the first transmission data.

Optionally, in an implementation of the second aspect, the first indication information is further used to indicate at least one of the following correspondences: a correspondence between the first air interface format and the time length of the first timer, a correspondence between the first transmission data and the time length of the first timer, and a correspondence between the time length of the first timer and a combination of the first air interface format and the first transmission data; and the determining a time length of a first timer based on the feature information of the first air interface format and/or the feature information of the first transmission data includes: determining the time length of the first timer based on the correspondence indicated by the first indication information and at least one of the first air interface format and the feature information of the first transmission data.

Optionally, in an implementation of the second aspect, the first indication information is further used to directly specify a time length of a timer; and the determining a time length of a first timer based on the feature information of the first air interface format and/or the feature information of the first transmission data includes: determining the time length of the first timer based on the timer time length specified by the first indication information.

Optionally, in an implementation of the second aspect, the determining a time length of a first timer based on the feature information of the first air interface format and/or the feature information of the first transmission data includes: when second indication information is not received, determining the time length of the first timer based on the correspondence indicated by the first indication information and the at least one of the first air interface format and the feature information of the first transmission data, where the second indication information is carried by PDCCH signaling and is used to indicate at least one of the following correspondences: a correspondence between the first air interface format and the time length of the first timer and a correspondence between the feature information of the first transmission data and the time length of the first timer.

Optionally, in an implementation of the second aspect, before the determining a time length of a first timer, the method further includes: receiving PDCCH signaling, where the PDCCH signaling indicates the first transmission data and carries second indication information, and the second indication information indicates at least one of the following correspondences: a correspondence between the first air interface format and the time length of the first timer and a correspondence between the feature information of the first transmission data and the time length of the first timer; and the determining a time length of a first timer based on the feature information of the first air interface format and/or the feature information of the first transmission data includes: determining the time length of the first timer based on the correspondence indicated by the second indication information and the at least one of the first air interface format and the feature information of the first transmission data.

Optionally, in an implementation of the second aspect, the first timer uses any one of the following units: a millisecond, a microsecond, a transmission time interval (TTI) of the first air interface format, a slot of the first air interface format, a mini-slot of the first air interface format, and a subframe of the first air interface format.

According to a third aspect, a wireless communication method is provided, including: obtaining feature information of a first air interface format; and determining a time length of a first timer based on the feature information of the first air interface format, where the first timer is started when a second timer expires, the first timer is used for monitoring a downlink control channel (e.g., a PDCCH) to obtain control information that indicates retransmission of first transmission data, the second timer is started when the first transmission data is sent or received, and the second timer is used to indicate that monitoring the downlink control channel (e.g., a PDCCH) is not required within the time length of the second timer.

Optionally, the second timer is started when a PDCCH is received, where the PDCCH is a PDCCH that indicates transmission of the first transmission data or indicates retransmission of the first transmission data.

Optionally, the first timer may be an uplink retransmission timer or a downlink retransmission timer.

Optionally, the second timer may be an uplink HARQ round trip time timer or a downlink HARQ round trip time timer.

Optionally, the first transmission data may be uplink data or downlink data.

Therefore, in an embodiment of this application, a terminal device can flexibly configure a time length of the first timer (an uplink retransmission timer or a downlink retransmission timer) based on feature information of an air interface format used in a data transmission process.

Optionally, in an implementation of the third aspect, when the first transmission data is downlink data, the first timer is started when decoding of the first transmission data fails and the second timer expires.

Optionally, in an implementation of the third aspect, the feature information of the first air interface format includes at least one of the following: a subcarrier spacing and a cyclic prefix length.

Optionally, in an implementation of the third aspect, the first air interface format is an air interface format used for transmitting PDCCH signaling, where the PDCCH signaling is used to indicate the first transmission data; the first air interface format is an air interface format used for transmitting the first transmission data; the first air interface format is an air interface format used for transmitting PDCCH signaling, where the PDCCH signaling is used to indicate retransmission of the first transmission data; the first air interface format is an air interface format used for retransmitting the first transmission data; or the first air interface format is an air interface format preset for determining the time length of the first timer.

Optionally, in an implementation of the third aspect, the method further includes: receiving first indication information sent by a network device, where the first indication information is used to indicate a correspondence between an air interface format and a time length of a timer used for monitoring the downlink control channel (e.g., a PDCCH); and the determining a time length of a first timer based on the feature information of the first air interface format includes: determining the time length of the first timer based on the correspondence indicated by the first indication information and the first air interface format.

Optionally, in an implementation of the third aspect, the determining a time length of a first timer based on the feature information of the first air interface format includes: when second indication information is not received, determining the time length of the first timer based on the correspondence indicated by the first indication information and the first air interface format, where the second indication information is carried by PDCCH signaling and is used to indicate a correspondence between the first air interface format and the time length of the first timer.

Optionally, in an implementation of the third aspect, before the determining a time length of a first timer, the method further includes: receiving PDCCH signaling, where the PDCCH signaling indicates the first transmission data and carries second indication information, and the second indication information is used to indicate a correspondence between the first air interface format and the time length of the first timer; and the determining a time length of a first timer based on the feature information of the first air interface format includes: determining the time length of the first timer based on the correspondence indicated by the second indication information and the first air interface format.

Optionally, in an implementation of the third aspect, the first timer uses any one of the following units: a millisecond, a microsecond, a transmission time interval (TTI) of the first air interface format, a slot of the first air interface format, a mini-slot of the first air interface format, and a subframe of the first air interface format.

According to a fourth aspect, an embodiment of this application provides a wireless communications device, including modules or units that can perform the method according to the first aspect or any optional implementation of the first aspect.

According to a fifth aspect, an embodiment of this application provides a wireless communications device, including modules or units that can perform the method according to the second aspect or any optional implementation of the second aspect.

According to a sixth aspect, an embodiment of this application provides a wireless communications device, including modules or units that can perform the method according to the third aspect or any optional implementation of the third aspect.

According to a seventh aspect, a wireless communications device is provided, including: a memory, a transceiver, and a processor. The memory stores program code that can be used to indicate execution of the first aspect or any optional implementation of the first aspect. When the code is executed, the processor can implement various operations performed by a transmit-end device in the method.

According to an eighth aspect, a wireless communications device is provided, including: a memory, a transceiver, and a processor. The memory stores program code that can be used to indicate execution of the second aspect or any optional implementation of the second aspect. When the code is executed, the processor can implement various operations performed by a transmit-end device in the method.

According to a ninth aspect, a wireless communications device is provided, including: a memory, a transceiver, and a processor. The memory stores program code that can be used to indicate execution of the third aspect or any optional implementation of the third aspect. When the code is executed, the processor can implement various operations performed by a receive-end device in the method.

According to a tenth aspect, a computer storage medium is provided. The computer storage medium stores program code, and the program code can be used to indicate execution of the method in the first aspect or any optional implementation of the first aspect.

According to an eleventh aspect, a computer storage medium is provided. The computer storage medium stores program code, and the program code can be used to indicate execution of the method in the second aspect or any optional implementation of the second aspect.

According to a twelfth aspect, a computer storage medium is provided. The computer storage medium stores program code, and the program code can be used to indicate execution of the method in the third aspect or any optional implementation of the third aspect.

According to a thirteenth aspect, a chip system is provided. The chip system includes a processor, configured to implement the method in the first aspect and any possible implementation of the first aspect. In a possible design, the chip system further includes a memory, and the memory is configured to store a computer program instruction for the processor to perform the method in the first aspect. The chip system may include a chip, or may include a chip and another discrete device.

According to a fourteenth aspect, a chip system is provided. The chip system includes a processor, configured to implement the method in the second aspect and any possible implementation of the second aspect. In a possible design, the chip system further includes a memory, and the memory is configured to store a computer program instruction for the processor to perform the method in the second aspect. The chip system may include a chip, or may include a chip and another discrete device.

According to a fifteenth aspect, a chip system is provided. The chip system includes a processor, configured to implement the method in the third aspect and any possible implementation of the third aspect. In a possible design, the chip system further includes a memory, and the memory is configured to store a computer program instruction for the processor to perform the method in the third aspect. The chip system may include a chip, or may include a chip and another discrete device.

According to a sixteenth aspect, this application provides a computer program product. The computer program product includes computer program code. When the computer program code runs on a computer, the computer is enabled to perform the method in the first aspect and any possible implementation of the first aspect.

According to a seventeenth aspect, this application provides a computer program product. The computer program product includes computer program code. When the computer program code runs on a computer, the computer is enabled to perform the method in the second aspect and any possible implementation of the second aspect.

According to an eighteenth aspect, this application provides a computer program product. The computer program product includes computer program code. When the computer program code runs on a computer, the computer is enabled to perform the method in the third aspect and any possible implementation of the third aspect.

BRIEF DESCRIPTION OF DRAWINGS

FIG. 1 is a schematic diagram of a communications system for wireless communication according to this application;

FIG. 2 is a schematic flowchart of a wireless communication method according to an embodiment of this application;

FIG. 3 is a schematic flowchart of a wireless communication method according to another embodiment of this application;

FIG. 15 is a schematic flowchart of a wireless communication method according to still another embodiment of this application;

FIG. 16 is a schematic flowchart of a wireless communication method according to still another embodiment of this application;

DESCRIPTION OF EMBODIMENTS

Figure 4:
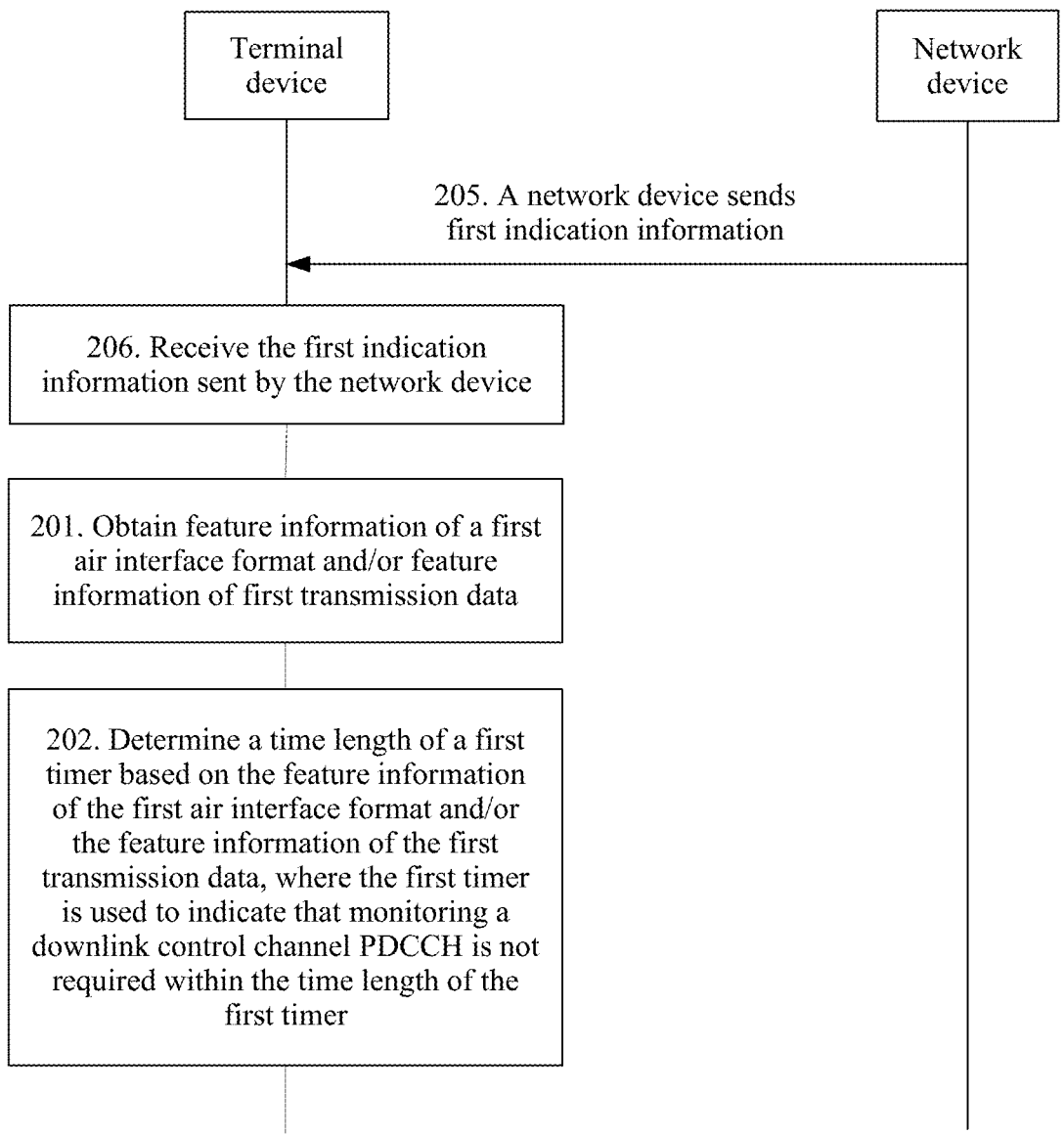
FIG. 4 is a schematic flowchart of a wireless communication method according to still another embodiment of this application.

The following describes technical solutions of embodiments in this application with reference to accompanying drawings.

FIG. 1 is a schematic diagram of a communications system for wireless communication according to this application. As shown in FIG. 1, the communications system 100 includes a network device 102, and the network device 102 may include a plurality of antennas such as antennas 104, 106, 108, 110, 112, and 114. In addition, the network device 102 may additionally include a transmitter chain and a receiver chain. A person of ordinary skill in the art may understand that, the transmitter chain may be a transmission system or a transmitter, the receiver chain may be a receiving system or a receiver, and the transmitter chain and the receiver chain may each include a plurality of components (for example, a processor, a modulator, a multiplexer, a demodulator, a demultiplexer, or an antenna) related to signal sending and receiving.

The network device 102 may communicate with a plurality of terminal devices (for example, a terminal device 116 and a terminal device 122). However, it may be understood that the network device 102 may communicate with any quantity of terminal devices that are similar to the terminal device 116 or 122. The terminal devices 116 and 122 each may be, for example, a cellular phone, a smartphone, a portable computer, a handheld communications device, a handheld computing device, a satellite radio apparatus, a Global Positioning System, a personal digital assistant (PDA), and/or any other suitable device used for communication in the wireless communications system 100.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (FDD) system, the forward link 118 and the reverse link 120 may use different frequency bands, and the forward link 124 and the reverse link 126 may use different frequency bands.

For another example, in a time division duplex (TDD) system and a full duplex system, the forward link 118 and the reverse link 120 may use a same frequency band, and the forward link 124 and the reverse link 126 may use a same frequency band.

Each antenna (or an antenna group including a plurality of antennas) and/or area designed for communication is referred to as a sector of the network device 102. For example, an antenna group may be designed to communicate with a terminal device in a sector within coverage of the network device 102. In a process in which the network device 102 communicates with the terminal devices 116 and 122 respectively by using the forward links 118 and 124, transmit antennas of the network device 102 may improve signal to noise ratios of the forward links 118 and 124 through beamforming. In addition, compared with a manner in which a network device sends signals to all terminal devices by using a single antenna, when the network device 102 sends, through beamforming, signals to the terminal devices 116 and 122 that are randomly distributed in related coverage, a mobile device in a neighboring cell receives less interference.

Within a given time, the network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a specific quantity of data bits that need to be sent to the wireless communications receiving apparatus by using a channel. The data bits may be included in a transport block (or a plurality of transport blocks) of data, and the transport block may be segmented to generate a plurality of code blocks.

In addition, the communications system 100 may be a public land mobile network (PLMN), a D2D (Device to Device) network, an M2M (Machine to Machine) network, or another network. FIG. 1 is merely a simplified schematic diagram of an example. The network may further include another network device that is not shown in FIG. 1.

A transmit end (a receive end) in this embodiment of this application may be a network device. The network device may be a device that communicates with a terminal device, for example, a network device or a network device controller. Each network device may provide communication coverage for a specific geographic area, and may communicate with a terminal device (for example, UE) in the coverage area (a cell). The network device may be a network device (for example, a base transceiver station (BTS)) in a Global System for Mobile Communications (GSM) system or a Code Division Multiple Access (CDMA) system, or a network device (for example, a NodeB (NB)) in a Wideband Code Division Multiple Access (WCDMA) system, or an evolved network device (for example, an evolved Node B (eNB or eNodeB)) in an LTE system, or a radio controller in a cloud radio access network (CRAN). Alternatively, the network device may be a network device in a future 5G network, a network device in a future evolved public land mobile network (PLMN), or the like.

The receive end (the transmit end) in this embodiment of this application may be a terminal device. The terminal device may be an access terminal, user equipment (UE), a subscriber unit, a subscriber station, a mobile station, a remote station, a remote terminal, a mobile terminal, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device that has a wireless communication function, a computing device, another processing device connected to a wireless modem, an in-vehicle device, a wearable device, a terminal device in the Internet of Things, a virtual reality device, a terminal device in a future 5G network, a terminal device in a future evolved public land mobile network (PLMN), or the like.

A wireless communication method and device provided in embodiments of this application may be applied to a terminal device or a network device. The terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant messaging software. In addition, in embodiments of this application, a specific structure of an execution entity of the wireless communication method is not particularly limited in this application, provided that communication can be implemented based on the data transmission method in embodiments of this application by running a program that records code of the data transmission method in embodiments of this application. For example, the wireless communication method in embodiments of this application may be performed by a terminal device or a network device, or may be performed by a function module that can invoke the program and execute the program in a terminal device or a network device.

FIG. 2 is a schematic flowchart of a wireless communication method 200 according to an embodiment of this application. As shown in FIG. 2, the method 200 includes the following content.

201. Obtain feature information of a first air interface format and/or feature information of first transmission data.

Optionally, a terminal device obtains the first air interface format configured by a network device.

Optionally, the first transmission data may be uplink data or downlink data.

Optionally, the feature information of the first air interface format includes at least one of the following: a subcarrier spacing and a cyclic prefix length.

Optionally, the network device may configure different air interface formats for the terminal device at different frequencies. The terminal device may transmit, in an air interface format (a frequency), a physical downlink control channel (PDCCH) that indicates the first transmission data, and transmit the first transmission data in another air interface format (a frequency); or may transmit a PDCCH that indicates the first transmission data and transmit the first transmission data, in an air interface format (a frequency).

Optionally, the network device may configure different air interface formats for the terminal device at different frequencies. The terminal device may transmit, in an air interface format (a frequency), a PDCCH that indicates retransmission of the first transmission data, and retransmit the first transmission data in another air interface format (a frequency); or may transmit a PDCCH that indicates retransmission of the first transmission data and retransmit the first transmission data, in an air interface format (a frequency).

Optionally, the network device may configure different air interface formats for the terminal device at different frequencies. The terminal device may use a same air interface format (a frequency) or different air interface formats (frequencies) to transmit the first transmission data and retransmit the first transmission data.

Optionally, the network device may configure different air interface formats for the terminal device in different slots. The terminal device may transmit, in an air interface format (a slot), a PDCCH that indicates the first transmission data, and transmit the first transmission data in another air interface format (a slot); or may transmit a PDCCH that indicates the first transmission data and transmit the first transmission data, in an air interface format (a slot).

Optionally, the network device may configure different air interface formats for the terminal device in different slots. The terminal device may transmit, in an air interface format (a slot), a PDCCH that indicates retransmission of the first transmission data, and retransmit the first transmission data in another air interface format (a slot); or may transmit a PDCCH that indicates retransmission of the first transmission data and retransmit the first transmission data, in an air interface format (a slot).

Optionally, the network device may configure different air interface formats for the terminal device in different slots. The terminal device may use a same air interface format (a slot) or different air interface formats (slots) to transmit the first transmission data and retransmit the first transmission data.

Optionally, the first air interface format may be an air interface format used for transmitting PDCCH signaling, where the PDCCH signaling is used to indicate the first transmission data; the first air interface format may be an air interface format used for transmitting the first transmission data; the first air interface format may be an air interface format used for transmitting PDCCH signaling, where the PDCCH signaling is used to indicate retransmission of the first transmission data; or the first air interface format may be used for retransmitting the first transmission data.

Optionally, the first air interface format may be a preset air interface format used for determining a time length of a first timer. For example, a subcarrier spacing of the first air interface format is 15 kHz, and a cyclic prefix length is 4.69 µs.

Optionally, the network device may preset the feature information of the first air interface format, and the terminal device determines the time length of the first timer based on the preset feature information of the first air interface format.

Optionally, the preset air interface format used for determining the time length of the first timer may be a reference air interface format.

Optionally, the feature information of the first transmission data includes a size of a transport block of the first transmission data and/or channel bandwidth occupied by the first transmission data.

Optionally, the PDCCH signaling generally refers to physical downlink control signaling, and includes PDCCH signaling, enhanced physical downlink control channel (EPDCCH) signaling, and all signaling that implements physical downlink control or all signaling that carries downlink control information (DCI).

202. Determine a time length of a first timer based on the feature information of the first air interface format and/or the feature information of the first transmission data, where the first timer is used to indicate that monitoring a downlink control channel (e.g., a PDCCH) is not required within the time length of the first timer.

Optionally, the first timer is started when the first transmission data is sent or received.

Optionally, the first timer is started when a PDCCH is received, where the PDCCH is a PDCCH that indicates transmission of the first transmission data or indicates retransmission of the first transmission data.

Optionally, the first timer may be an uplink HARQ round trip time timer, or may be a downlink HARQ round trip time timer, or may be another timer that implements a function of an uplink HARQ round trip time timer or a downlink HARQ round trip time timer.

Optionally, if the first timer is a downlink HARQ round trip time timer or another timer that implements a function of a downlink HARQ round trip time timer, the first timer specifies a required minimum time that a media access control (MAC) entity expects to receive downlink HARQ retransmission. If the first timer is an uplink HARQ round trip time timer or another timer that implements a function of an uplink HARQ round trip time timer, the first timer specifies a required minimum time that a MAC entity expects to receive an uplink HARQ retransmission grant.

Optionally, the terminal device may determine the time length of the first timer based on the feature information of the first air interface format and/or the feature information of the first transmission data.

Optionally, the first timer uses any one of the following units: a millisecond, a microsecond, a transmission time interval (TTI) of the first air interface format, a slot of the first air interface format, a mini-slot of the first air interface format, and a subframe of the first air interface format.

Optionally, in an embodiment, as shown in FIG. 3, the method 200 further includes the following content.

203. Obtain feature information of a second air interface format.

Optionally, the terminal device obtains the second air interface format configured by the network device.

Optionally, the second air interface format is different from the first air interface format. For example, when a subcarrier spacing of the first air interface format is 15 kHz, a subcarrier spacing of the second air interface format is 60 kHz.

Optionally, the feature information of the second air interface format includes at least one of the following: a subcarrier spacing and a cyclic prefix length.

Optionally, the second air interface format may be an air interface format used for transmitting PDCCH signaling, where the PDCCH signaling is used to indicate the first transmission data; the second air interface format may be an air interface format used for transmitting the first transmission data; the second air interface format may be an air interface format used for transmitting PDCCH signaling, where the PDCCH signaling is used to indicate retransmission of the first transmission data; or the second air interface format may be an air interface format used for retransmitting the first transmission data.

Optionally, the second air interface format may be a preset air interface format used for determining a time length of a second timer. For example, a subcarrier spacing of the second air interface format is 15 kHz, and a cyclic prefix length is 4.69 μs.

Optionally, the network device may preset the feature information of the second air interface format, and the terminal device determines the time length of the second timer based on the preset feature information of the second air interface format.

Optionally, the preset air interface format used for determining the time length of the second timer may be a reference air interface format.

204. Determine a time length of a second timer based on the feature information of the second air interface format, where the second timer is started when the first timer expires, and the second timer is used for monitoring the downlink control channel (e.g., a PDCCH) to obtain control information that indicates retransmission of the first transmission data.

Optionally, when the first transmission data is downlink data, the second timer is started when decoding of the first transmission data fails and the first timer expires.

Optionally, the second timer may be an uplink retransmission timer, or may be a downlink retransmission timer, or may be another timer that implements a function of an uplink retransmission timer or a downlink retransmission timer.

Optionally, the second timer uses any one of the following units: a millisecond, a microsecond, a transmission time interval (TTI) of the second air interface format, a slot of the second air interface format, a mini-slot of the second air interface format, and a subframe of the second air interface format.

Optionally, in an embodiment, as shown in FIG. 4, the method 200 further includes the following content.

205. A network device sends first indication information.

Optionally, the network device may send the first indication information by using higher layer signaling. For example, the higher layer signaling may be radio resource control (RRC) signaling.

206. Receive the first indication information sent by the network device.

Optionally, the terminal device may receive the first indication information by receiving the higher layer signaling.

Optionally, the first indication information is used to indicate at least one of the following correspondences: a correspondence between an air interface format and a time length of a timer, a correspondence between transmission data and a time length of a timer, and a correspondence between a time length of a timer and a combination of an air interface format and transmission data.

Optionally, information indicated by the first indication information may be semi-static information. When the first indication information is not sent again to reconfigure the correspondence or delete the correspondence, the correspondence configured in the first indication information is valid for a long time.

Optionally, the transmission data may include the following information: a size of a transport block of data transmitted on an uplink/downlink shared channel, and bandwidth of the uplink/downlink shared channel occupied by the transmission data; and may further include other information that may be used for determining the time length of the first timer.

Optionally, a timer determined based on the correspondence in the first indication information may be used for stopping monitoring the downlink control channel (e.g., a PDCCH), and the timer is started when the first transmission data is sent or received.

Optionally, the first indication information is further used to indicate at least one of the following correspondences: a correspondence between the first air interface format and the time length of the first timer, a correspondence between the first transmission data and the time length of the first timer, and a correspondence between the time length of the first timer and a combination of the first air interface format and the first transmission data.

Optionally, the terminal device may determine the time length of the first timer based on the correspondence indicated by the first indication information and at least one of the first air interface format and the feature information of the first transmission data.

Optionally, the first indication information is further used to directly specify a time length of a timer.

For example, the first indication information indicates that a time length of a timer used for an air interface format 1 is 1 ms or one TTI, and a time length of a timer used for an air interface format 2 is 2 ms or two TTIs. The time lengths may be in units of respective TTIs for the air interface formats, or may be in a unit of a TTI for a preset air interface format.

Optionally, the terminal device may determine the time length of the first timer based on the timer time length specified by the first indication information.

Optionally, when second indication information is not received, the time length of the first timer is determined based on the correspondence indicated by the first indication information and the at least one of the first air interface format and the feature information of the first transmission data, where the second indication information is carried by the PDCCH signaling and is used to indicate at least one of the following correspondences: a correspondence between the first air interface format and the time length of the first timer and a correspondence between the feature information of the first transmission data and the time length of the first timer.

Optionally, the correspondence indicated by the first indication information may be a mapping table among an air interface format, transmission data, and a timer.

Optionally, the terminal device may query, based on the first air interface format and the feature information of the first transmission data, the correspondence (the mapping table) indicated by the first indication information, to further determine the time length of the first timer.

As shown in Table 1 below, an air interface format is the air interface format 1, and feature information of a transmission object includes a size of a transport block of data transmitted on an uplink/downlink shared channel, and bandwidth of the uplink/downlink shared channel occupied by the transmission data. For example, a size of a transport block may be 20 resource blocks (RBs), 30 RBs, or the like, and a bandwidth of the uplink/downlink shared channel occupied by the transmission data may be 20 kHz, 40 kHz, or the like. The time length of the first timer is determined based on different sizes of transport blocks and bandwidth values. It can be learned from Table 1 that, when the first air interface format is the air interface format 1, a size of a transport block is 20 RBs, and a bandwidth is 40 kHz, the time length, of the first timer, corresponding to the air interface format 1 may be 2 milliseconds, 2 microseconds, two times the transmission time interval (TTI) of the air interface format 1 or the preset air interface format, two times the slot of the air interface format 1 or the preset air interface format, two times the min-slot of the air interface format 1 or the preset air interface format, or two times the subframe of the air interface format 1 or the preset air interface format.

TABLE 1

Air interface format 1

| Transport block size | | Timer time length Bandwidth | | |
|---|---|---|---|---|
| | | 20 kHz | 40 kHz | |
| ... | ... | 1 | 1 | ... |
| 20 RBs | ... | 1 | 2 | ... |
| 30 RBs | ... | 1 | 2 | ... |
| ... | ... | ... | ... | ... |

Figure 5:
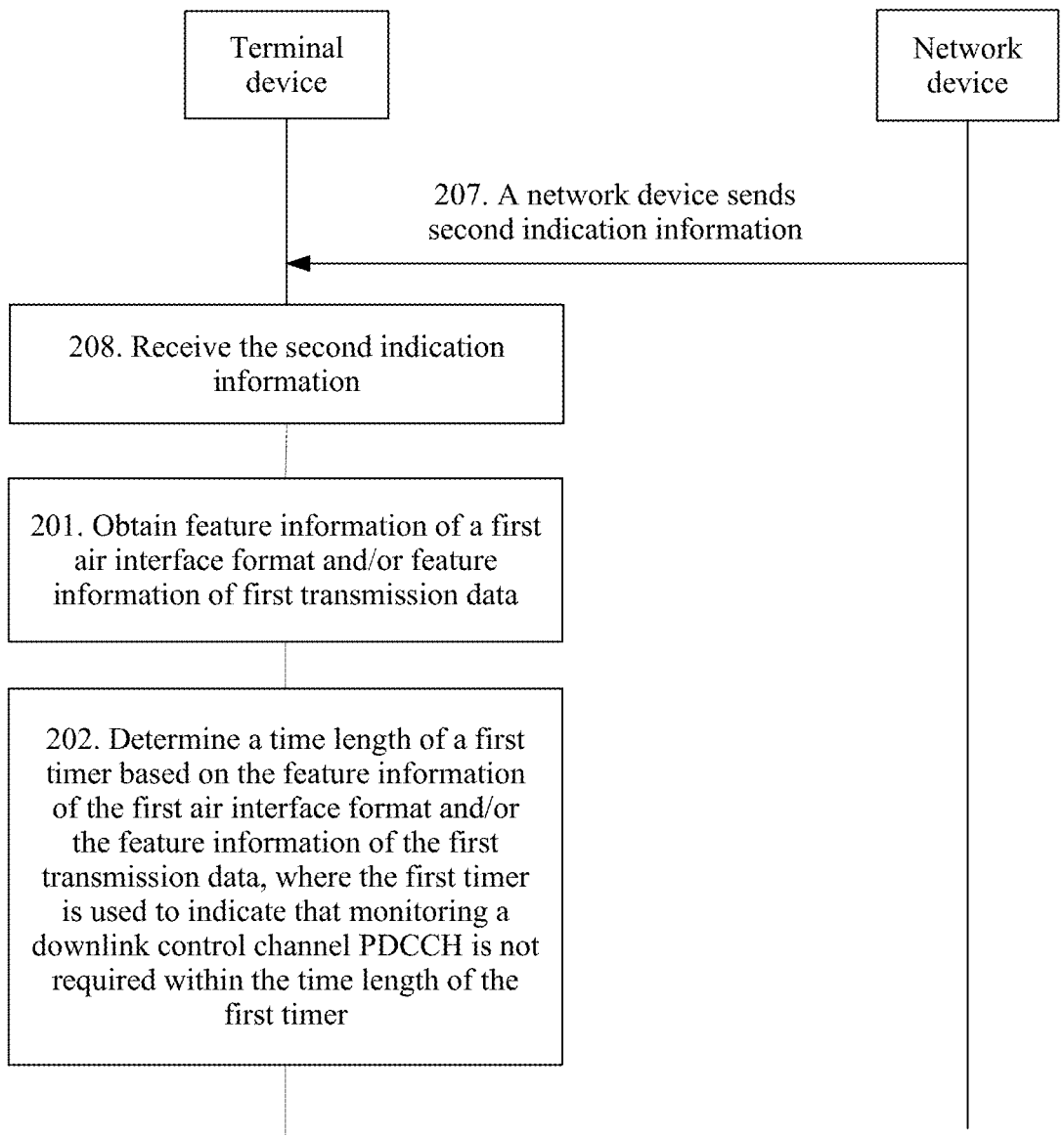
FIG. 5 is a schematic flowchart of a wireless communication method according to still another embodiment of this application.

Optionally, in an embodiment, as shown in FIG. 5, the method 200 further includes the following content.

207. A network device sends second indication information.

Optionally, the network device may send the second indication information by using physical layer signaling.

Optionally, the physical layer signaling may be any one of the following: new physical layer signaling, a new physical layer signaling format, a new field in physical layer signaling, and search space of new physical layer signaling.

208. Receive the second indication information.

Optionally, the terminal device may receive the second indication information by receiving the physical layer signaling.

Optionally, the terminal device receives the PDCCH signaling, where the PDCCH signaling indicates transmission of the first transmission data and carries the second indication information.

Optionally, information indicated by the second indication information may be dynamic information that is valid only for the first transmission data or is valid only for current transmission of the first transmission data. Optionally, the second indication information is used to indicate a correspondence between the time length of the first timer and at least one of the first air interface format and the feature information of the first transmission data.

Optionally, the terminal device determines the time length of the first timer based on the correspondence indicated by the second indication information and at least one of the first air interface format and the feature information of the first transmission data.

Optionally, the second indication information may directly indicate the time length, of the first timer, corresponding to the first transmission data.

Optionally, the second indication information may directly indicate the time length, of the first timer, corresponding to the first air interface format.

Optionally, the second indication information may further indicate a mapping table, as shown in Table 1. The terminal device determines the time length of the first timer based on the mapping table and the at least one of the first air interface format and the feature information of the first transmission data.

Optionally, the time length of the first timer, determined based on the correspondence indicated by the second indication information and the at least one of the first air interface format and the feature information of the first transmission data, is applicable to only transmission of the first transmission data or current transmission of the first transmission data. Optionally, when the information indicated by the second indication information is valid, the terminal ignores the information indicated by the first indication information.

Optionally, the time length of the first timer may be at least one transmission time interval (TTI) of the first air interface format, or may be at least one slot, min-slot, or subframe of the first air interface format.

Optionally, the time length of the first timer may be at least one transmission time interval (TTI) of the preset air interface format, or may be at least one slot, min-slot, or subframe of the preset air interface format.

Optionally, the network device configures different air interface formats for the terminal device on different frequency domains. The terminal device may transmit the first transmission data and/or retransmit the first transmission data, on different frequency domain resources; or transmit the PDCCH that indicates the first transmission data and/or retransmit the first transmission data, on different frequency domain resources; or transmit the first transmission data and/or transmit the PDCCH that indicates retransmission of the first transmission data, on different frequency domain resources; or transmit the PDCCH that indicates the first transmission data and/or transmit the PDCCH that indicates retransmission of the first transmission data, on different frequency domain resources.

Figure 6:
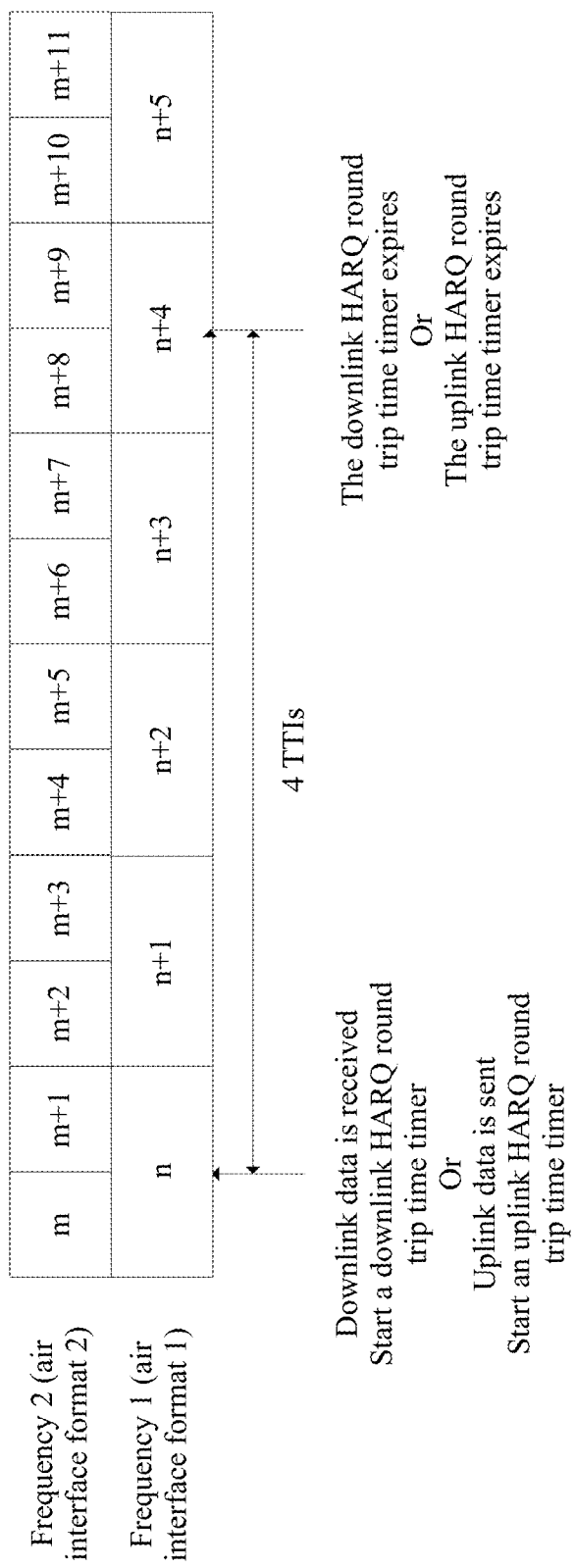
FIG. 6 to FIG. 9 are schematic diagrams of determining a time length of a first timer in a wireless communication method according to an embodiment of this application.

For example, as shown in FIG. 6, two air interface formats are configured for the terminal device at two frequencies, where a frequency 1 corresponds to the air interface format 1, and a frequency 2 corresponds to the air interface format 2. The terminal device transmits the first transmission data at the frequency 1. The transmission time interval (TTI) of the air interface format 1 is two times a transmission time interval (TTI) of the air interface format 2. In this case, the air interface format 1 is the first air interface format, the first timer may be an uplink HARQ round trip time timer or a downlink HARQ round trip time timer corresponding to the air interface format 1, and the first indication information or the second indication information indicates that the time length of the first timer may be four times the transmission time interval (TTI) of the air interface format 1, namely, four TTIs. Certainly, the time length of the first timer may alternatively be another multiple of the transmission time interval (TTI) of the air interface format 1, for example, 1 TTI, 2 TTIs, 3 TTIs, 5 TTIs, or 8 TTIs, or may be a multiple of the slot, the min-slot, or the subframe of the air interface format 1, provided that the first transmission data can be transmitted. This is not specifically limited in this embodiment of this application.

Figure 7:
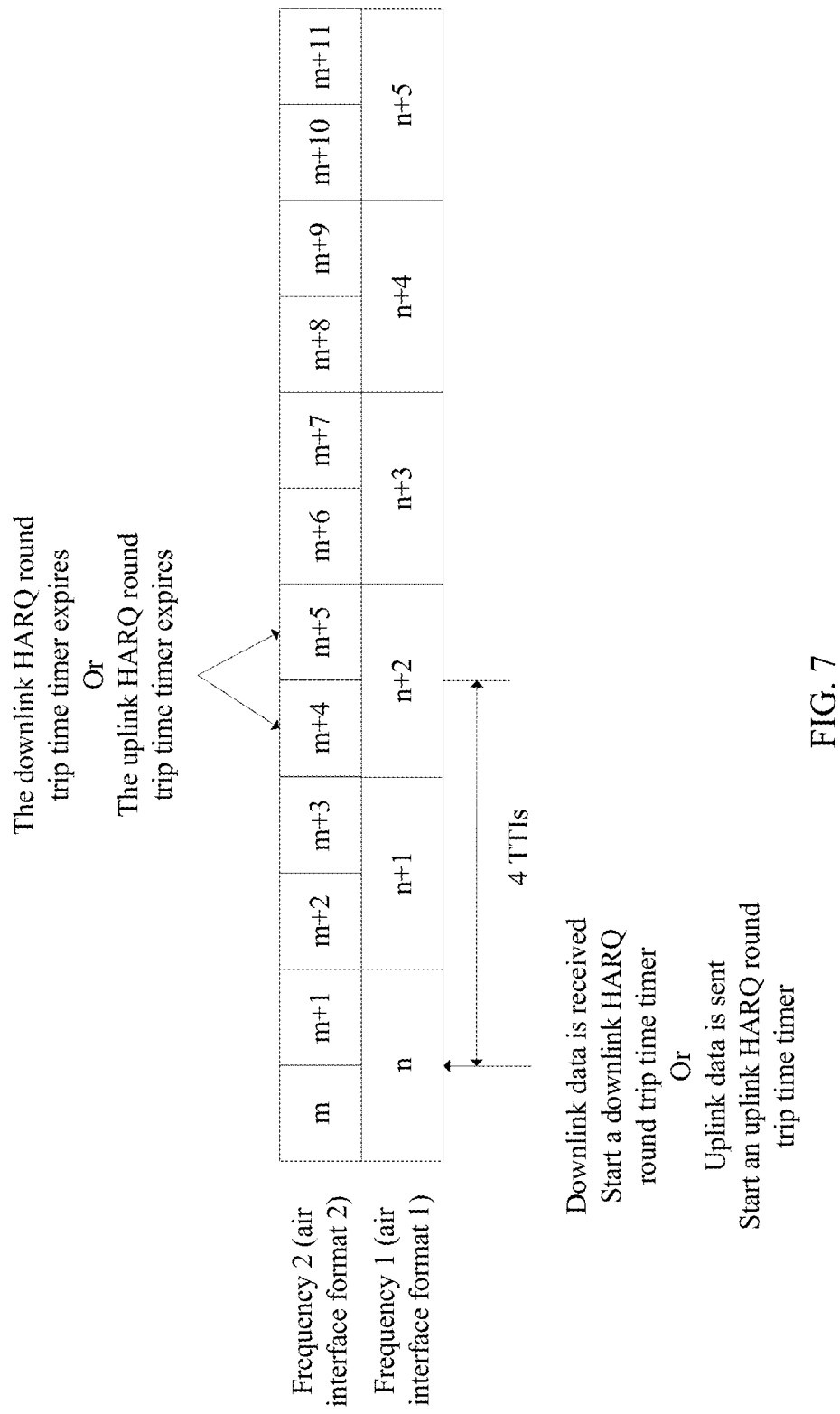

For another example, as shown in FIG. 7, two air interface formats are configured for the terminal device at two frequencies, where a frequency 1 corresponds to the air interface format 1, and a frequency 2 corresponds to the air interface format 2. The terminal device transmits the first transmission data at the frequency 1. The transmission time interval (TTI) of the air interface format 1 is two times the transmission time interval (TTI) of the air interface format 2. In this case, the air interface format 2 is the first air interface format, the first timer may be an uplink HARQ round trip time timer or a downlink HARQ round trip time timer corresponding to the air interface format 2, and the first indication information or the second indication information indicates that the time length of the first timer may be four times the transmission time interval (TTI) of the air interface format 2, namely, four TTIs. Certainly, the time length of the first timer may alternatively be another multiple of the transmission time interval (TTI) of the air interface format 2, for example, 1 TTI, 2 TTIs, 3 TTIs, 5

TTIs, or 8 TTIs, or may be a multiple of the slot, the min-slot, or the subframe of the air interface format 2, provided that the first transmission data can be transmitted. This is not specifically limited in this embodiment of this application.

Optionally, the network device configures different air interface formats for the terminal device on different time domains. The terminal device may transmit the first transmission data and/or transmit the PDCCH that indicates retransmission of the first transmission data, on different time domain resources; or transmit the PDCCH that indicates the first transmission data and/or retransmit the first transmission data, on different time domain resources; or transmit the first transmission data and/or retransmit the first transmission data, on different time domain resources; or transmit the PDCCH that indicates the first transmission data and/or transmit the PDCCH that indicates retransmission of the first transmission data, on different time domain resources.

Figure 8:
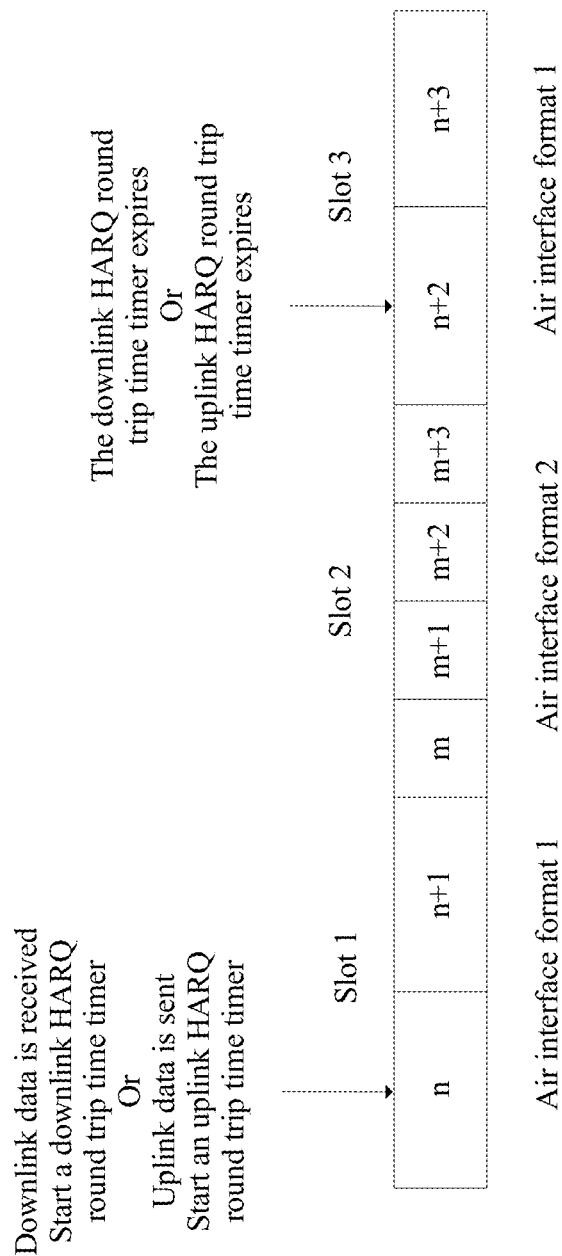

For example, as shown in FIG. 8, two air interface formats are configured for the terminal device in three slots, where a slot 1 and a slot 3 correspond to the air interface format 1, and a slot 2 corresponds to the air interface format 2. The terminal device transmits the first transmission data in the slot 1. The transmission time interval (TTI) of the air interface format 1 is two times the transmission time interval (TTI) of the air interface format 2. In this case, the air interface format 1 is the first air interface format, the first timer may be an uplink HARQ round trip time timer or a downlink HARQ round trip time timer corresponding to the air interface format 1, and the first indication information or the second indication information indicates that the time length of the first timer may be four times the transmission time interval (TTI) of the air interface format 1, namely, four TTIs. Certainly, the time length of the first timer may alternatively be another multiple of the transmission time interval (TTI) of the air interface format 1, for example, 1 TTI, 2 TTIs, 3 TTIs, 5 TTIs, or 8 TTIs, or may be a multiple of the slot, the min-slot, or the subframe of the air interface format 1, provided that the first transmission data can be transmitted. This is not specifically limited in this embodiment of this application.

Figure 9:
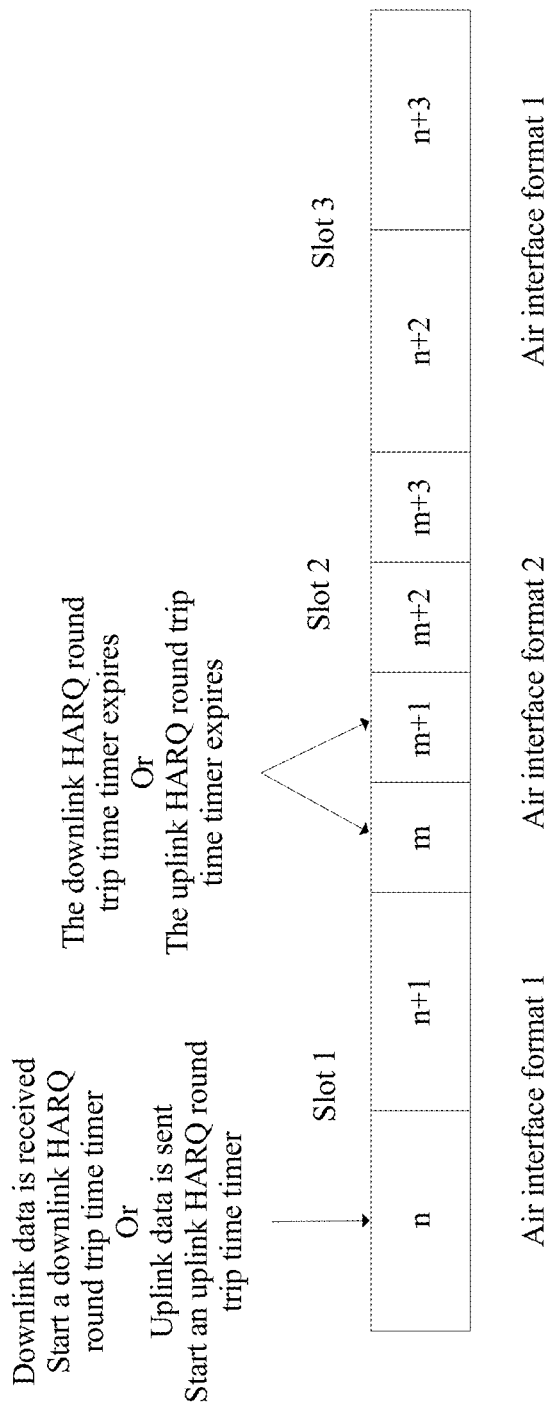

For another example, as shown in FIG. 9, two air interface formats are configured for the terminal device in three slots, where a slot 1 and a slot 3 correspond to the air interface format 1, and a slot 2 corresponds to the air interface format 2. The terminal device transmits the first transmission data in the slot 1. The transmission time interval (TTI) of the air interface format 1 is two times the transmission time interval (TTI) of the air interface format 2. In this case, the air interface format 2 is the first air interface format, the first timer may be an uplink HARQ round trip time timer or a downlink HARQ round trip time timer corresponding to the air interface format 2, and the first indication information or the second indication information indicates that the time length of the first timer may be four times the transmission time interval (TTI) of the air interface format 2, namely, four TTIs. Certainly, the time length of the first timer may alternatively be another multiple of the transmission time interval (TTI) of the air interface format 2, for example, 1 TTI, 2 TTIs, 3 TTIs, 5 TTIs, or 8 TTIs, or may be a multiple of the slot, the min-slot, or the subframe of the air interface format 2, provided that the first transmission data can be transmitted. This is not specifically limited in this embodiment of this application.

Figure 10:
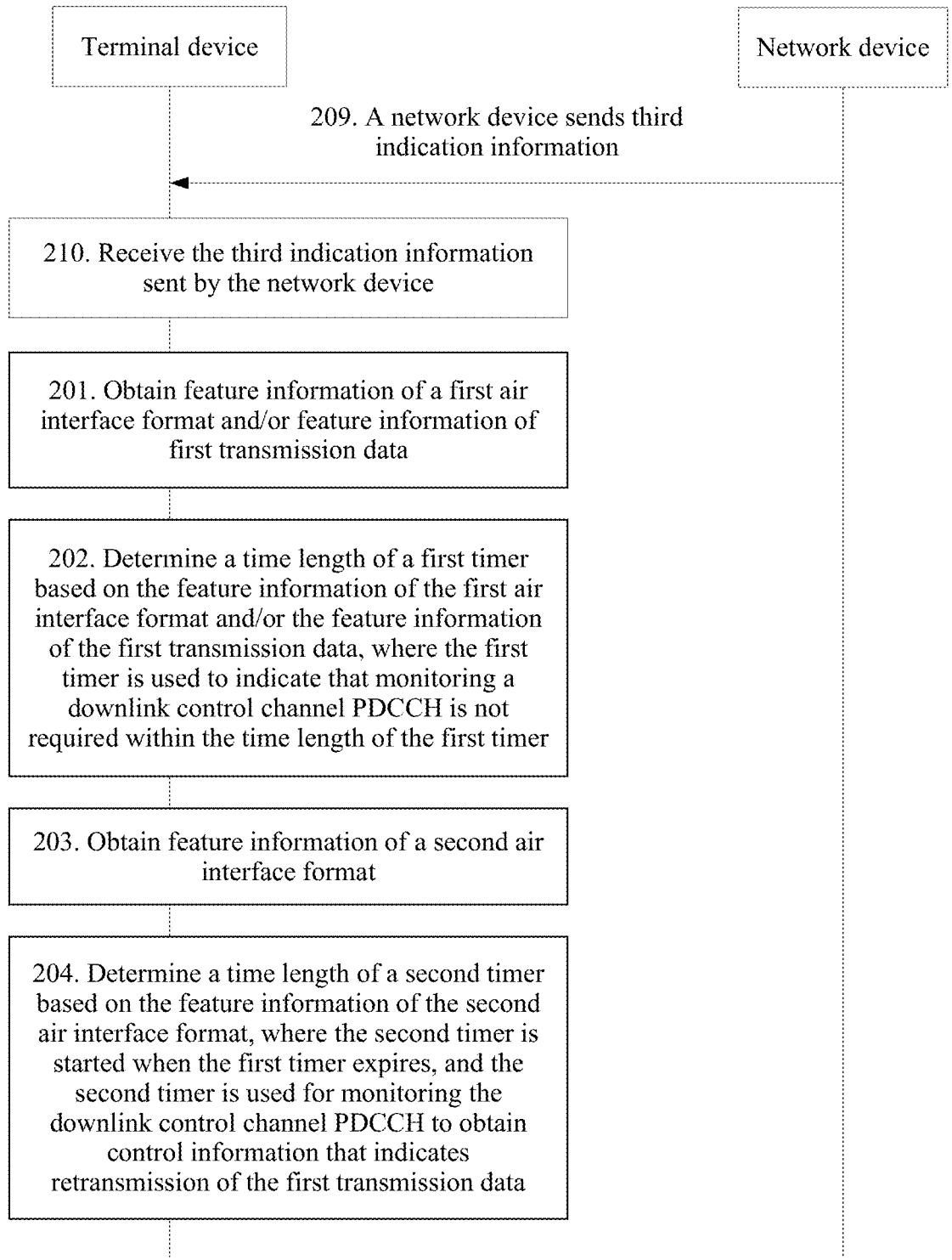
FIG. 10 is a schematic flowchart of a wireless communication method according to still another embodiment of this application.

Optionally, in an embodiment, as shown in FIG. 10, the method 200 further includes the following content.

209. A network device sends third indication information.

Optionally, the network device may send the third indication information by using higher layer (an RRC layer) signaling.

210. Receive the third indication information sent by the network device.

Optionally, the third indication information is used to indicate a correspondence between an air interface format and a time length of a timer used for monitoring the downlink control channel (e.g., a PDCCH).

Optionally, the third indication information is further used to indicate a correspondence between the second air interface format and the time length of the second timer.

Optionally, the terminal device may receive the third indication information by receiving the higher layer (the RRC layer) signaling.

Optionally, the terminal device may determine the time length of the second timer based on the correspondence indicated by the third indication information and the second air interface format.

Optionally, the third indication information may directly indicate the time length, of the second timer, corresponding to the second air interface format.

For example, the third indication information indicates that a time length of a timer used for the air interface format 1 is 1 ms or one TTI, and a time length of a timer used for the air interface format 2 is 2 ms or two TTIs. The time lengths may be in units of respective TTIs for the air interface formats, or may be in a unit of a TTI for a preset air interface format.

Optionally, information indicated by the third indication information may be semi-static information. When the information indicated by the third indication information is not sent again, the third indication information is valid for a long time.

Optionally, the second timer determined based on the third indication information is valid for a long time unless reconfiguration is performed.

Optionally, when fourth indication information is not received, the time length of the second timer is determined based on the correspondence indicated by the third indication information and the second air interface format, where the fourth indication information is carried by the PDCCH signaling and is used to indicate a correspondence between the second air interface format and the time length of the second timer.

Optionally, the correspondence indicated by the third indication information may be a mapping table between an air interface format and a timer.

Optionally, the terminal device may query, based on the second air interface format, the correspondence (the mapping table) indicated by the third indication information, to further determine the time length of the second timer.

As shown in Table 2 below, an air interface format is the air interface format 1, the air interface format 2, or the like. When the first air interface format is the air interface format 1, it can be learned from Table 2 that the time length, of the first timer, corresponding to the air interface format 1 may be 2 milliseconds, 2 microseconds, two times the transmission time interval (TTI) of the air interface format 1, two times the slot of the air interface format 1, two times the min-slot of the air interface format 1, or two times the subframe of the air interface format 1.

TABLE 2

| Air Interface Format | Timer Time Length |
| --- | --- |
| Air interface format 1 | 2 |
| Air interface format 2 | 2 |
| Air interface format 3 | 3 |
| Air interface format 4 | 4 |
| ... | ... |

Figure 11:
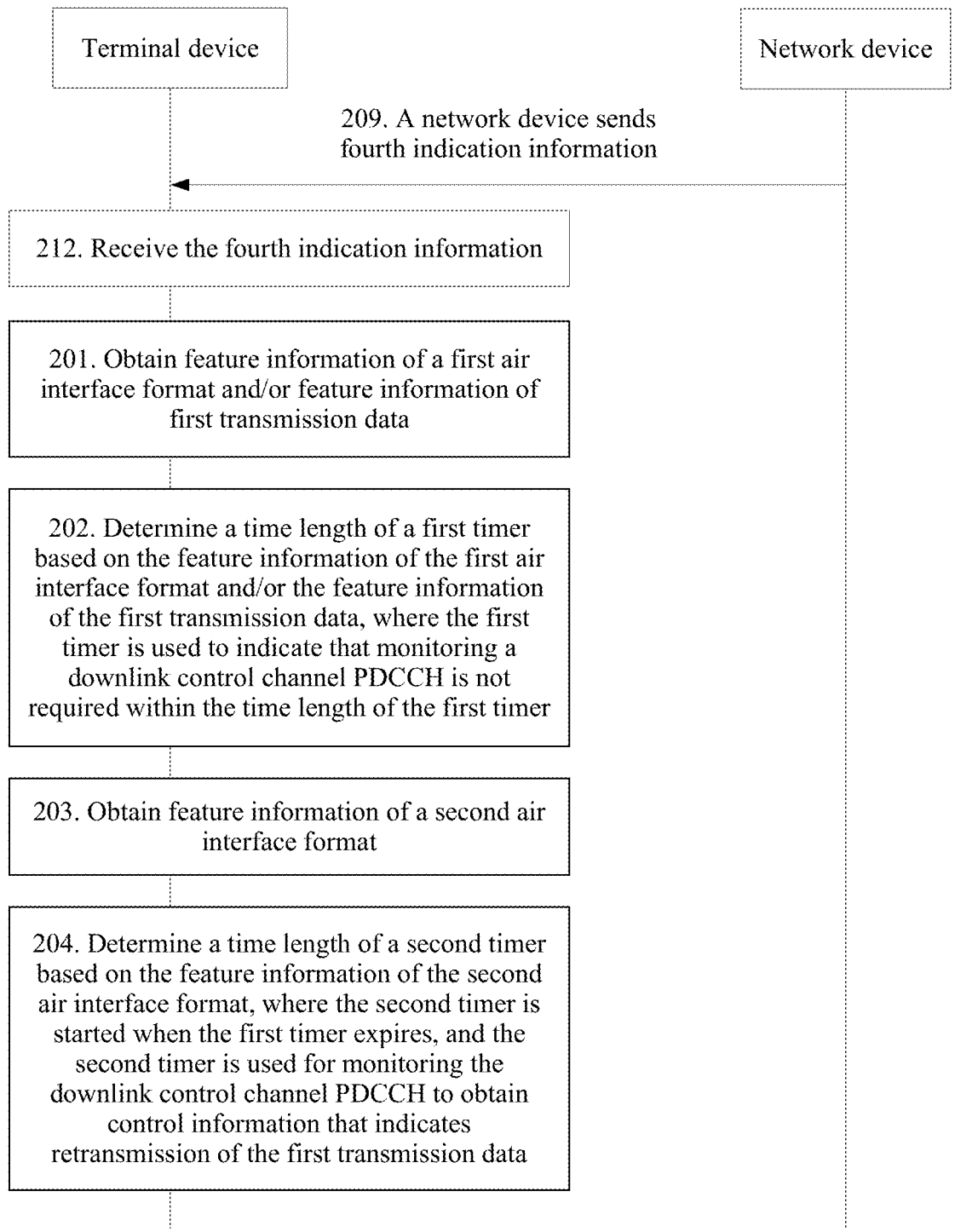
FIG. 11 is a schematic flowchart of a wireless communication method according to still another embodiment of this application.

Optionally, in an embodiment, as shown in FIG. 11, the method 200 further includes the following content.

211. A network device sends fourth indication information.

Optionally, the network device may send the fourth indication information by using physical layer signaling.

Optionally, the physical layer signaling may be any one of the following: new physical layer signaling, a new physical layer signaling format, a new field in physical layer signaling, and search space of new physical layer signaling.

212. Receive the fourth indication information.

Optionally, the terminal device may receive the fourth indication information by receiving the physical layer signaling.

Optionally, the terminal device receives the PDCCH signaling, where the PDCCH signaling indicates the first transmission data and carries the fourth indication information.

Optionally, information indicated by the fourth indication information may be dynamic information that is valid only for the first transmission data or is valid only for current transmission of the first transmission data. Optionally, the fourth indication information is used to indicate a correspondence between the second air interface format and the time length of the second timer.

Optionally, the terminal device may determine the time length of the second timer based on the correspondence indicated by the fourth indication information and the second air interface format.

Optionally, the fourth indication information may be included in a PDCCH that indicates the first transmission data.

Optionally, the fourth indication information may directly indicate the time length, of the second timer, corresponding to the first transmission data.

Optionally, the fourth indication information may directly indicate the time length, of the second timer, corresponding to the second air interface format.

Optionally, the fourth indication information may indicate a mapping table, as shown in Table 2. The terminal device determines the time length of the second timer based on the mapping table.

Optionally, the time length of the second timer, determined based on the correspondence indicated by the fourth indication information and the second air interface format, is only applicable to receiving of a PDCCH that indicates retransmission of the first transmission data or receiving of a PDCCH that indicates current retransmission of the first transmission data.

Optionally, when the information indicated by the fourth indication information is valid, the terminal ignores the information indicated by the third indication information.

Optionally, the time length of the second timer may be at least one transmission time interval (TTI) of the second air interface format, or may be at least one slot, min-slot, or subframe of the second air interface format.

Optionally, the time length of the second timer may be at least one transmission time interval (TTI) of the preset air interface format, or may be at least one slot, min-slot, or subframe of the preset air interface format.

Optionally, the network device configures different air interface formats for the terminal device on different frequency domains. The terminal device may transmit the first transmission data and/or retransmit the first transmission data, on different frequency domain resources; or transmit the PDCCH that indicates the first transmission data and/or retransmit the first transmission data, on different frequency domain resources; or transmit the first transmission data and/or transmit the PDCCH that indicates retransmission of the first transmission data, on different frequency domain resources; or transmit the PDCCH that indicates the first transmission data and/or transmit the PDCCH that indicates retransmission of the first transmission data, on different frequency domain resources.

Figure 12:
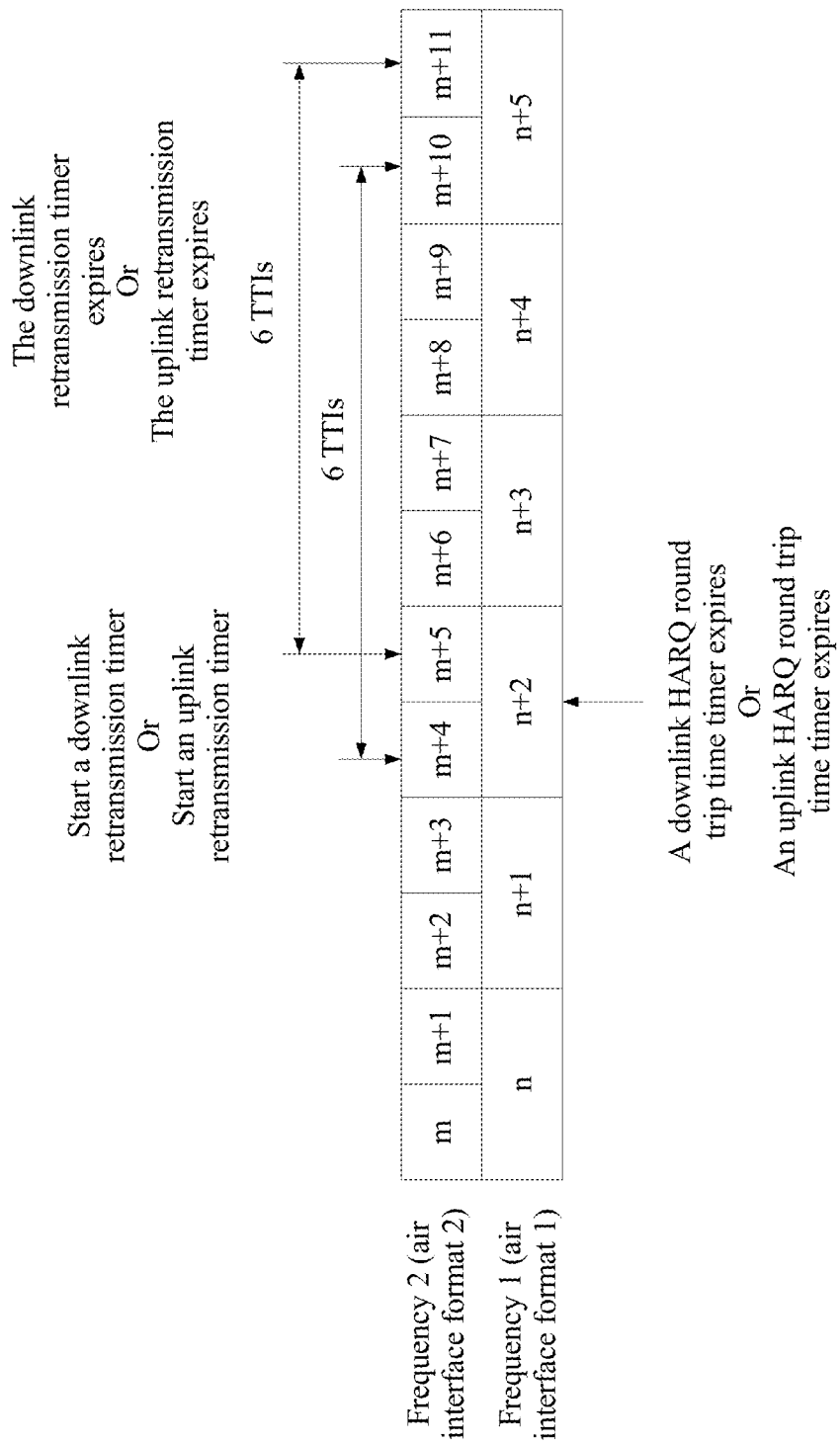
FIG. 12 to FIG. 14 are schematic diagrams of determining a time length of a second timer in a wireless communication method according to an embodiment of this application.

For example, as shown in FIG. 12, two air interface formats are configured for the terminal device at two frequencies, where a frequency 1 corresponds to the air interface format 1, and a frequency 2 corresponds to the air interface format 2. The terminal device transmits the first transmission data at the frequency 1. The transmission time interval (TTI) of the air interface format 1 is two times the transmission time interval (TTI) of the air interface format 2. In this case, the air interface format 1 is the first air interface format, and the air interface format 2 is the second air interface format. The second timer may be an uplink retransmission timer or a downlink retransmission timer corresponding to the air interface format 2. The third indication information or the fourth indication information indicates that the time length of the second timer may be six times the transmission time interval (TTI) of the air interface format 2, namely, 6 TTIs. After the first timer expires within n+2, the second timer may be started within m+4, or may be started within m+5. In addition, the third indication information or the fourth indication information may indicate that the time length of the second timer may alternatively be another multiple of the transmission time interval (TTI) of the air interface format 2, for example, 1 TTI, 2 TTIs, 4 TTIs, 5 TTIs, or 8 TTIs, or may be a multiple of the slot, the min-slot, or the subframe of the air interface format 2. This is not specifically limited in this embodiment of this application.

Figure 13:
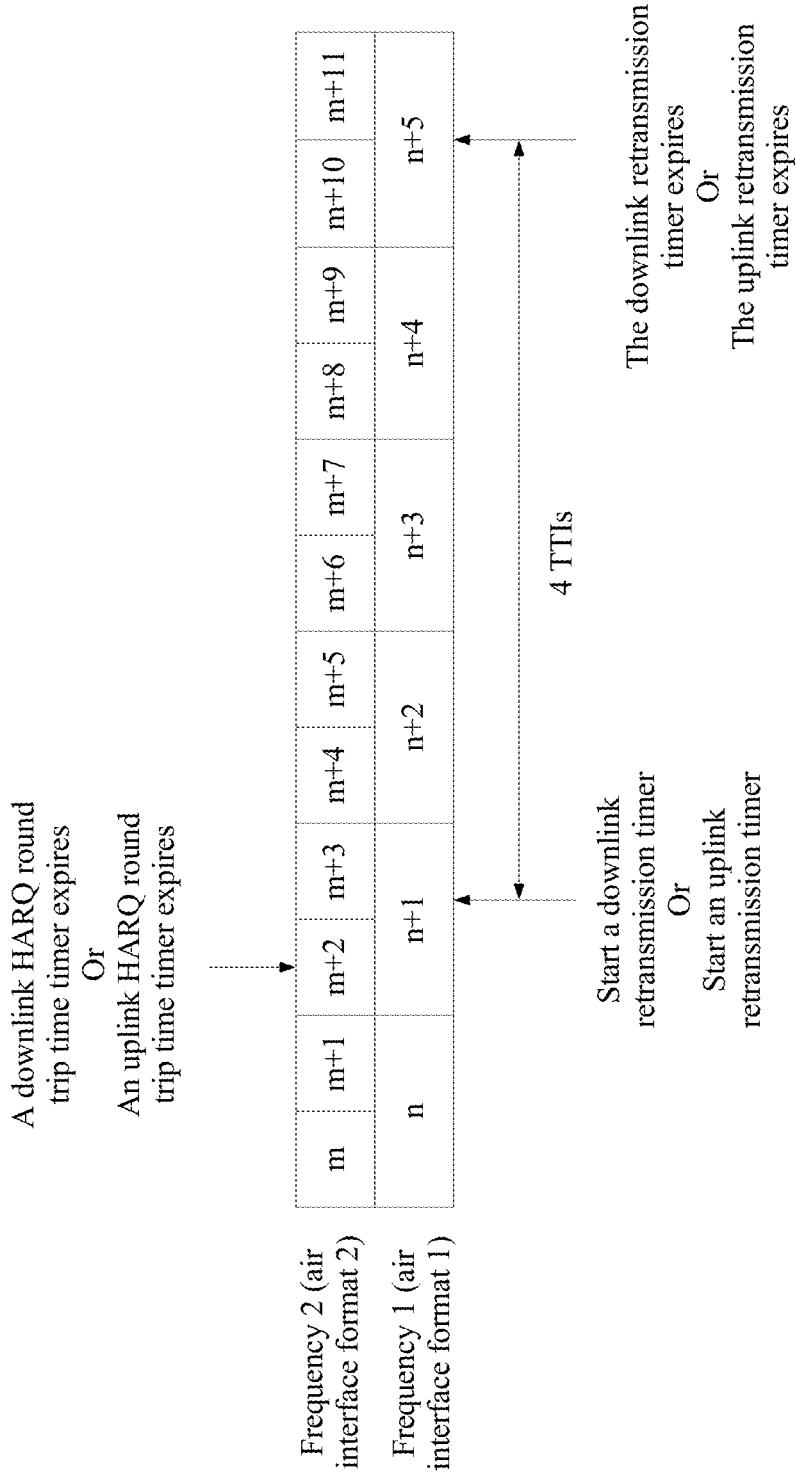

For another example, as shown in FIG. 13, two air interface formats are configured for the terminal device at two frequencies, where a frequency 1 corresponds to the air interface format 1, and a frequency 2 corresponds to the air interface format 2. The terminal device transmits the first transmission data at the frequency 2. The transmission time interval (TTI) of the air interface format 1 is two times the transmission time interval (TTI) of the air interface format 2. In this case, the air interface format 2 is the first air interface format, and the air interface format 1 is the second air interface format. The second timer may be an uplink retransmission timer or a downlink retransmission timer corresponding to the air interface format 1. The third indication information or the fourth indication information indicates that the time length of the second timer may be four times the transmission time interval (TTI) of the air interface format 1, namely, 4 TTIs. After the first timer expires within m+2, the second timer may be started within n+1. In addition, the third indication information or the fourth indication information may indicate that the time length of the second timer may alternatively be another multiple of the transmission time interval (TTI) of the air interface format 1, for example, 1 TTI, 2 TTIs, 5 TTIs, 6 TTIs, or 8 TTIs, or may be a multiple of the slot, the min-slot, or the subframe of the air interface format 1. This is not specifically limited in this embodiment of this application.

Optionally, the network device configures different air interface formats for the terminal device on different time domain. The terminal device may transmit the first transmission data and/or transmit the PDCCH that indicates retransmission of the first transmission data, on different time domain resources; or transmit the PDCCH that indicates the first transmission data and/or retransmit the first transmission data, on different time domain resources; or transmit the first transmission data and/or retransmit the first transmission data, on different time domain resources; or transmit the PDCCH that indicates the first transmission data and/or transmit the PDCCH that indicates retransmission of the first transmission data, on different time domain resources.

Figure 14:
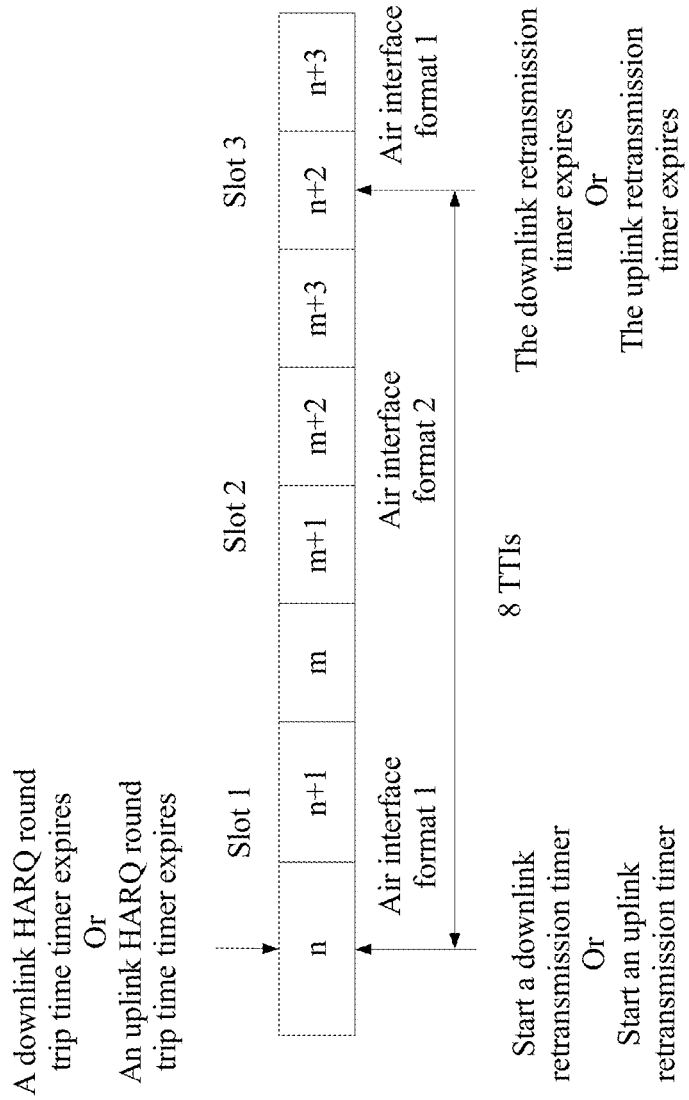

For example, as shown in FIG. 14, two air interface formats are configured for the terminal device in three slots, where a slot 1 and a slot 3 correspond to the air interface format 1, and a slot 2 corresponds to the air interface format 2. The transmission time interval (TTI) of the air interface format 1 is two times the transmission time interval (TTI) of the air interface format 2. In this case, the air interface format 2 is the second air interface format, the second timer may be an uplink retransmission timer or a downlink retransmission timer corresponding to the air interface format 2, and the third indication information or the fourth indication information indicates that the time length of the second timer may be eight times the transmission time interval (TTI) of the air interface format 2, namely, eight TTIs; or may be another multiple of the transmission time interval (TTI) of the air interface format 2, for example, 1 TTI, 2 TTIs, 3 TTIs, 5 TTIs, or 6 TTIs; or may be a multiple of the slot, the min-slot, or the subframe of the air interface format 2. This is not specifically limited in this embodiment of this application.

Optionally, that the transmission time interval (TTI) of the air interface format 1 is two times the transmission time interval (TTI) of the air interface format 2 is merely a special example for better describing this embodiment of this application. There is no absolute multiple relationship between the transmission time interval (TTI) of the air interface format 1 and the transmission time interval (TTI) of the air interface format 2. The two TTIs may be the same or different.

Therefore, in this embodiment of this application, the terminal device may flexibly configure the time length of the first timer (an uplink HARQ round trip time timer or a downlink HARQ round trip time timer) and the time length of the second timer (an uplink retransmission timer or a downlink retransmission timer) based on feature information of an air interface format used in a data transmission process and/or feature information of transmission data.

FIG. 15 is a schematic block diagram of a wireless communication method 300 according to an embodiment of this application. As shown in FIG. 15, the method 300 includes:

310. Obtain feature information of a first air interface format and/or feature information of first transmission data.

320. Determine a time length of a first timer based on the feature information of the first air interface format and/or the feature information of the first transmission data, where the first timer is used to indicate that monitoring a downlink control channel (e.g., a PDCCH) is not required within the time length of the first timer.

Optionally, the first timer may be an uplink HARQ round trip time timer or a downlink HARQ round trip time timer.

Optionally, the first timer is started when the first transmission data is sent or received.

Optionally, the first timer is started when a PDCCH is received, where the PDCCH is a PDCCH that indicates transmission of the first transmission data or indicates retransmission of the first transmission data.

Optionally, the first transmission data may be uplink data or downlink data.

Optionally, the feature information of the first transmission data includes a size of a transport block of the first transmission data and/or channel bandwidth occupied by the first transmission data.

Optionally, the feature information of the first air interface format includes at least one of the following: a subcarrier spacing and a cyclic prefix length.

Optionally, the first air interface format is an air interface format used for transmitting PDCCH signaling, where the PDCCH signaling is used to indicate the first transmission data;

the first air interface format is an air interface format used for transmitting the first transmission data;

the first air interface format is an air interface format used for transmitting PDCCH signaling, where the PDCCH signaling is used to indicate retransmission of the first transmission data;

the first air interface format is an air interface format used for retransmitting the first transmission data; or the first air interface format is an air interface format preset for determining the time length of the first timer.

Optionally, the method further includes:

receiving first indication information sent by a network device, where the first indication information is used to indicate at least one of the following correspondences: a correspondence between an air interface format and a time length of a timer, a correspondence between transmission data and a time length of a timer, and a correspondence between a timer and a combination of an air interface format and transmission data.

The determining a time length of a first timer based on the feature information of the first air interface format and/or the feature information of the first transmission data includes:

determining the time length of the first timer based on the correspondence indicated by the first indication information and at least one of the first air interface format and the feature information of the first transmission data.

Optionally, the first indication information is further used to indicate at least one of the following correspondences: a correspondence between the first air interface format and the time length of the first timer, a correspondence between the first transmission data and the time length of the first timer, and a correspondence between the time length of the first timer and a combination of the first air interface format and the first transmission data.

The determining a time length of a first timer based on the feature information of the first air interface format and/or the feature information of the first transmission data includes:

determining the time length of the first timer based on the correspondence indicated by the first indication information and at least one of the first air interface format and the feature information of the first transmission data.

Optionally, the first indication information is further used to directly specify a time length of a timer.

The determining a time length of a first timer based on the feature information of the first air interface format and/or the feature information of the first transmission data includes:

determining the time length of the first timer based on the timer time length specified by the first indication information.

Optionally, the determining a time length of a first timer based on the feature information of the first air interface format and/or the feature information of the first transmission data includes:

when second indication information is not received, determining the time length of the first timer based on the correspondence indicated by the first indication information and the at least one of the first air interface format and the feature information of the first transmission data, where the second indication information is carried by the PDCCH signaling and is used to indicate at least one of the following correspondences: a correspondence between the first air interface format and the time length of the first timer and a correspondence between the feature information of the first transmission data and the time length of the first timer.

Optionally, before the determining a time length of a first timer, the method further includes:

receiving the PDCCH signaling, where the PDCCH signaling indicates the first transmission data and carries second indication information, and the second indication information indicates at least one of the following correspondences: a correspondence between the first air interface format and the time length of the first timer and a correspondence between the feature information of the first transmission data and the time length of the first timer.

The determining a time length of a first timer based on the feature information of the first air interface format and/or the feature information of the first transmission data includes:

determining the time length of the first timer based on the correspondence indicated by the second indication information and the at least one of the first air interface format and the feature information of the first transmission data.

Optionally, the first timer uses any one of the following units: a millisecond, a microsecond, a transmission time interval (TTI) of the first air interface format, a slot of the first air interface format, a mini-slot of the first air interface format, and a subframe of the first air interface format.

It should be understood that, for the steps in the wireless communication method 300 according to the embodiment of this application, reference may be made to the corresponding procedure of the first timer in the foregoing method 200. For brevity, details are not described herein again.

FIG. 16 is a schematic block diagram of a wireless communication method 400 according to an embodiment of this application. As shown in FIG. 16, the method 400 includes:

410. A terminal device obtains feature information of a first air interface format.

420. The terminal device determines a time length of a first timer based on the feature information of the first air interface format, where the first timer is started when a second timer expires, the first timer is used for monitoring a downlink control channel (e.g., a PDCCH) to obtain control information that indicates retransmission of first transmission data, the second timer is started when the first transmission data is sent or received, and the second timer is used for stopping monitoring the downlink control channel (e.g., a PDCCH).

Optionally, the second timer is started when a PDCCH is received, where the PDCCH is a PDCCH that indicates transmission of the first transmission data or indicates retransmission of the first transmission data.

Optionally, the first timer may be an uplink retransmission timer or a downlink retransmission timer.

Optionally, the second timer may be an uplink HARQ round trip time timer or a downlink HARQ round trip time timer.

Optionally, the first transmission data may be uplink data or downlink data.

Optionally, when the first transmission data is downlink data, the first timer is started when decoding of the first transmission data fails and the second timer expires.

Optionally, the feature information of the first air interface format includes at least one of the following: a subcarrier spacing and a cyclic prefix length.

Optionally, the first air interface format is an air interface format used for transmitting PDCCH signaling, where the PDCCH signaling is used to indicate the first transmission data;

the first air interface format is an air interface format used for transmitting the first transmission data;

the first air interface format is an air interface format used for transmitting PDCCH signaling, where the PDCCH signaling is used to indicate retransmission of the first transmission data;

the first air interface format is an air interface format used for retransmitting the first transmission data; or the first air interface format is an air interface format preset for determining the time length of the first timer.

Optionally, the method further includes:

receiving first indication information sent by a network device, where the first indication information is used to indicate a correspondence between an air interface format and a time length of a timer used for monitoring the downlink control channel (e.g., a PDCCH).

The determining a time length of a first timer based on the feature information of the first air interface format includes:

determining the time length of the first timer based on the correspondence indicated by the first indication information and the first air interface format.

Optionally, the first indication information is further used to indicate a correspondence between the first air interface format and the time length of the first timer.

Optionally, the determining a time length of a first timer based on the feature information of the first air interface format includes:

when second indication information is not received, determining the time length of the first timer based on the correspondence indicated by the first indication information and the first air interface format, where the second indication information is carried by the PDCCH signaling and is used to indicate a correspondence between the first air interface format and the time length of the first timer.

Optionally, before the determining a time length of a first timer, the method further includes:

receiving the PDCCH signaling, where the PDCCH signaling indicates the first transmission data and carries second indication information, and the second indication information is used to indicate a correspondence between the first air interface format and the time length of the first timer.

The determining a time length of a first timer based on the feature information of the first air interface format includes:

determining the time length of the first timer based on the correspondence indicated by the second indication information and the first air interface format.

Optionally, the first timer uses any one of the following units: a millisecond, a microsecond, a transmission time interval (TTI) of the first air interface format, a slot of the first air interface format, a mini-slot of the first air interface format, and a subframe of the first air interface format.

It should be understood that, for the steps in the wireless communication method 400 according to the embodiment of this application, reference may be made to the corresponding procedure of the second timer in the foregoing method 200. For brevity, details are not described herein again.

Figure 17:
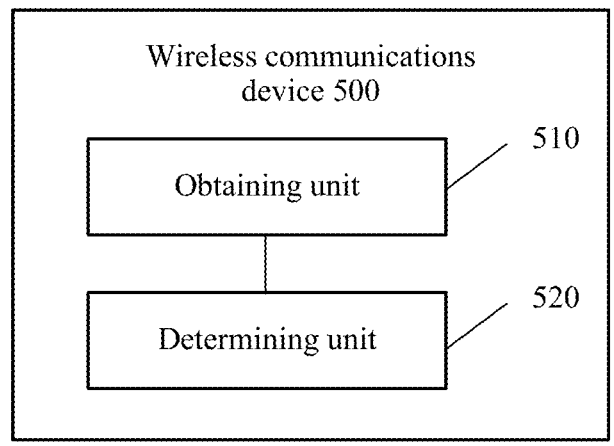
FIG. 17 is a schematic block diagram of a wireless communications device according to an embodiment of this application.

FIG. 17 is a schematic block diagram of a wireless communications device 500 according to an embodiment of this application. As shown in FIG. 17, the device 500 includes:

an obtaining unit 510, configured to obtain feature information of a first air interface format and/or feature information of first transmission data; and a determining unit 520, configured to determine a time length of a first timer based on the feature information of the first air interface format and/or the feature information of the first transmission data, where the first timer is used to indicate that monitoring a downlink control channel (e.g., a PDCCH) is not required within the time length of the first timer.

Optionally, the obtaining unit is further configured to obtain feature information of a second air interface format; and the determining unit is further configured to determine a time length of a second timer based on the feature information of the second air interface format, where the second timer is started when the first timer expires, and the second timer is used for monitoring the downlink control channel (e.g., a PDCCH) to obtain control information that indicates retransmission of the first transmission data.

Optionally, the feature information of the first transmission data includes a size of a transport block of the first transmission data and/or channel bandwidth occupied by the first transmission data.

Optionally, the first air interface format is an air interface format used for transmitting PDCCH signaling, where the PDCCH signaling is used to indicate the first transmission data;

the first air interface format is an air interface format used for transmitting the first transmission data;

the first air interface format is an air interface format used for transmitting PDCCH signaling, where the PDCCH signaling is used to indicate retransmission of the first transmission data;

the first air interface format is an air interface format used for retransmitting the first transmission data; or the first air interface format is an air interface format preset for determining the time length of the first timer.

Optionally, the second air interface format is an air interface format used for transmitting PDCCH signaling, where the PDCCH signaling is used to indicate the first transmission data;

the second air interface format is an air interface format used for transmitting the first transmission data;

the second air interface format is an air interface format used for transmitting PDCCH signaling, where the PDCCH signaling is used to indicate retransmission of the first transmission data;

the second air interface format is an air interface format used for retransmitting the first transmission data; or the second air interface format is an air interface format preset for determining the time length of the second timer.

Optionally, the device further includes:

a receiving unit, configured to receive first indication information sent by a network device, where the first indication information is used to indicate at least one of the following correspondences: a correspondence between an air interface format and a time length of a timer, a correspondence between transmission data and a time length of a timer, and a correspondence between a time length of a timer and a combination of an air interface format and transmission data.

The determining unit is configured to determine the time length of the first timer based on the correspondence indicated by the first indication information and at least one of the first air interface format and the feature information of the first transmission data.

Optionally, the determining unit is configured to: when second indication information is not received, determine the time length of the first timer based on the correspondence indicated by the first indication information and the at least one of the first air interface format and the feature information of the first transmission data, where the second indication information is carried by the PDCCH signaling and is used to indicate at least one of the following correspondences: a correspondence between the first air interface format and the time length of the first timer and a correspondence between the feature information of the first transmission data and the time length of the first timer.

Optionally, before the determining unit determines the time length of the first timer, the receiving unit is further configured to receive the PDCCH signaling, where the PDCCH signaling indicates the first transmission data and carries second indication information, and the second indication information indicates at least one of the following correspondences: a correspondence between the first air interface format and the time length of the first timer and a correspondence between the feature information of the first transmission data and the time length of the first timer.

The determining unit is configured to determine the time length of the first timer based on the correspondence indicated by the second indication information and the at least one of the first air interface format and the feature information of the first transmission data.

Optionally, the receiving unit is further configured to receive third indication information sent by a network device, where the third indication information is used to indicate a correspondence between an air interface format and a time length of a timer used for monitoring the downlink control channel (e.g., a PDCCH).

The determining unit is configured to determine the time length of the second timer based on the correspondence indicated by the third indication information and the second air interface format.

Optionally, the determining unit is configured to: when fourth indication information is not received, determine the time length of the second timer based on the correspondence indicated by the third indication information and the second air interface format, where the fourth indication information is carried by the PDCCH signaling and is used to indicate a correspondence between the second air interface format and the time length of the second timer.

Optionally, before the determining unit determines the time length of the second timer, the receiving unit is further configured to:

receive the PDCCH signaling, where the PDCCH signaling indicates the first transmission data and carries fourth indication information, and the fourth indication information is used to indicate a correspondence between the second air interface format and the time length of the second timer.

The determining unit is configured to:

determine the time length of the second timer based on the correspondence indicated by the fourth indication information and the second air interface format.

It should be understood that the foregoing and other operations and/or functions of the units of the wireless communications device 500 in this embodiment of this application are separately used to implement corresponding procedures of the method 200 in FIG. 2. For brevity, details are not described herein again.

Figure 18:
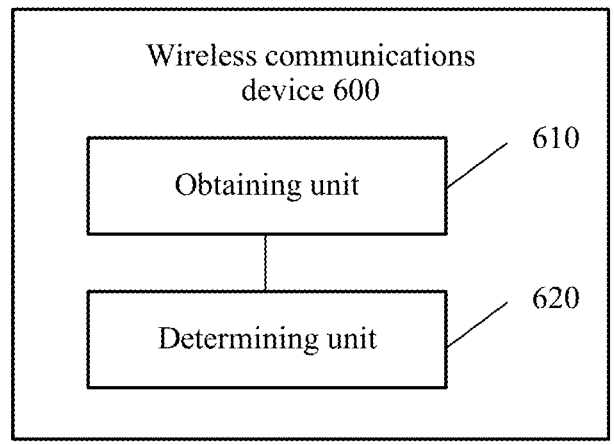
FIG. 18 is a schematic block diagram of a wireless communications device according to another embodiment of this application.

FIG. 18 is a schematic block diagram of a wireless communications device 600 according to an embodiment of this application. As shown in FIG. 18, the device 600 includes:

an obtaining unit 610, configured to obtain feature information of a first air interface format and/or feature information of first transmission data; and a determining unit 620, configured to determine a time length of a first timer based on the feature information of the first air interface format and/or the feature information of the first transmission data, where the first timer is used to indicate that monitoring a downlink control channel (e.g., a PDCCH) is not required within the time length of the first timer.

Optionally, the first timer may be an uplink HARQ round trip time timer or a downlink HARQ round trip time timer.

Optionally, the first timer is started when the first transmission data is sent or received.

Optionally, the first timer is started when a PDCCH is received, where the PDCCH is a PDCCH that indicates transmission of the first transmission data or indicates retransmission of the first transmission data.

Optionally, the first transmission data may be uplink data or downlink data.

Optionally, the feature information of the first transmission data includes a size of a transport block of the first transmission data and/or channel bandwidth occupied by the first transmission data.

Optionally, the feature information of the first air interface format includes at least one of the following: a subcarrier spacing and a cyclic prefix length.

Optionally, the first air interface format is an air interface format used for transmitting PDCCH signaling, where the PDCCH signaling is used to indicate the first transmission data;

the first air interface format is an air interface format used for transmitting the first transmission data;

the first air interface format is an air interface format used for transmitting PDCCH signaling, where the PDCCH signaling is used to indicate retransmission of the first transmission data;

the first air interface format is an air interface format used for retransmitting the first transmission data; or the first air interface format is an air interface format preset for determining the time length of the first timer.

Optionally, the device further includes:

a receiving unit 630, configured to receive first indication information sent by a network device, where the first indication information is used to indicate at least one of the following correspondences: a correspondence between an air interface format and a time length of a timer and a correspondence between transmission data and a time length of a timer.

The determining unit 620 is configured to:

determine the time length of the first timer based on the correspondence indicated by the first indication information and at least one of the first air interface format and the feature information of the first transmission data.

Optionally, the determining unit 620 is configured to:

when second indication information is not received, determine the time length of the first timer based on the correspondence indicated by the first indication information and the at least one of the first air interface format and the feature information of the first transmission data, where the second indication information is carried by the PDCCH signaling and is used to indicate at least one of the following correspondences: a correspondence between the first air interface format and the time length of the first timer and a correspondence between the feature information of the first transmission data and the time length of the first timer.

Optionally, before the time length of the first timer is determined, the device further includes:

a receiving unit 630, configured to receive the PDCCH signaling, where the PDCCH signaling indicates the first transmission data and carries second indication information, and the second indication information indicates at least one of the following correspondences: a correspondence between the first air interface format and the time length of the first timer and a correspondence between the feature information of the first transmission data and the time length of the first timer.

The determining unit 620 is configured to:

determine the time length of the first timer based on the correspondence indicated by the second indication information and the at least one of the first air interface format and the feature information of the first transmission data.

Optionally, the first timer uses any one of the following units: a millisecond, a microsecond, a transmission time interval (TTI) of the first air interface format, a slot of the first air interface format, a mini-slot of the first air interface format, and a subframe of the first air interface format.

It should be understood that the foregoing and other operations and/or functions of the units of the wireless communications device 600 in this embodiment of this application are separately used to implement corresponding procedures of the method 300 in FIG. 15. For brevity, details are not described herein again.

Figure 19:
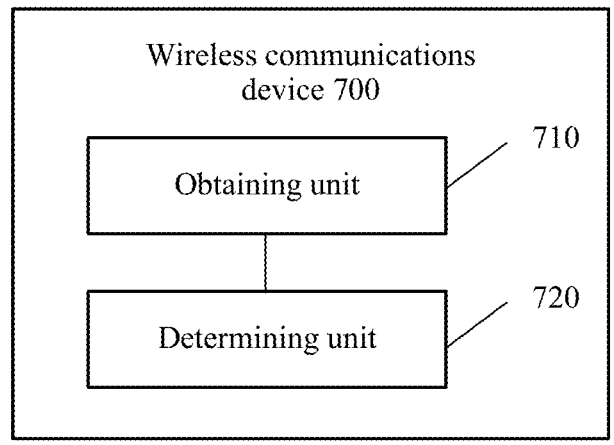
FIG. 19 is a schematic block diagram of a wireless communications device according to still another embodiment of this application.

FIG. 19 is a schematic block diagram of a wireless communications device 700 according to an embodiment of this application. As shown in FIG. 19, the device 700 includes:

an obtaining unit 710, configured to obtain feature information of a first air interface format; and a determining unit 720, configured to determine a time length of a first timer based on the feature information of the first air interface format, where the first timer is started when a second timer expires, the first timer is used for monitoring a downlink control channel (e.g., a PDCCH) to obtain control information that indicates retransmission of first transmission data, the second timer is started when the first transmission data is sent or received, and the second timer is used to indicate that monitoring the downlink control channel (e.g., a PDCCH) is not required within the time length of the second timer.

Optionally, the first timer may be an uplink retransmission timer or a downlink retransmission timer.

Optionally, the second timer may be an uplink HARQ round trip time timer or a downlink HARQ round trip time timer.

Optionally, the first transmission data may be uplink data or downlink data.

Optionally, when the first transmission data is downlink data, the first timer is started when decoding of the first transmission data fails and the second timer expires.

Optionally, the feature information of the first air interface format includes at least one of the following: a subcarrier spacing and a cyclic prefix length.

Optionally, the first air interface format is an air interface format used for transmitting PDCCH signaling, where the PDCCH signaling is used to indicate the first transmission data;

the first air interface format is an air interface format used for transmitting the first transmission data;

the first air interface format is an air interface format used for transmitting PDCCH signaling, where the PDCCH signaling is used to indicate retransmission of the first transmission data;

the first air interface format is an air interface format used for retransmitting the first transmission data; or the first air interface format is an air interface format preset for determining the time length of the first timer.

Optionally, the device further includes:

a receiving unit 730, configured to receive first indication information sent by a network device, where the first indication information is used to indicate a correspondence between an air interface format and a time length of a timer used for monitoring the downlink control channel (e.g., a PDCCH).

The determining unit 720 is configured to:

determine the time length of the first timer based on the correspondence indicated by the first indication information and the first air interface format.

Optionally, the determining unit 720 is configured to:

when second indication information is not received, determine the time length of the first timer based on the correspondence indicated by the first indication information and the first air interface format, where the second indication information is carried by the PDCCH signaling and is used to indicate a correspondence between the first air interface format and the time length of the first timer.

Optionally, before the time length of the first timer is determined, the device further includes:

a receiving unit 730, configured to receive PDCCH signaling, where the PDCCH signaling indicates the first transmission data and carries second indication information, and the second indication information is used to indicate a correspondence between the first air interface format and the time length of the first timer.

The determining unit 720 is configured to:

determine the time length of the first timer based on the correspondence indicated by the second indication information and the first air interface format.

Optionally, the first timer uses any one of the following units: a millisecond, a microsecond, a transmission time interval (TTI) of the first air interface format, a slot of the first air interface format, a mini-slot of the first air interface format, and a subframe of the first air interface format.

It should be understood that the foregoing and other operations and/or functions of the units of the wireless communications device 700 in this embodiment of this application are separately used to implement corresponding procedures of the method 400 in FIG. 16. For brevity, details are not described herein again.

Figure 20:
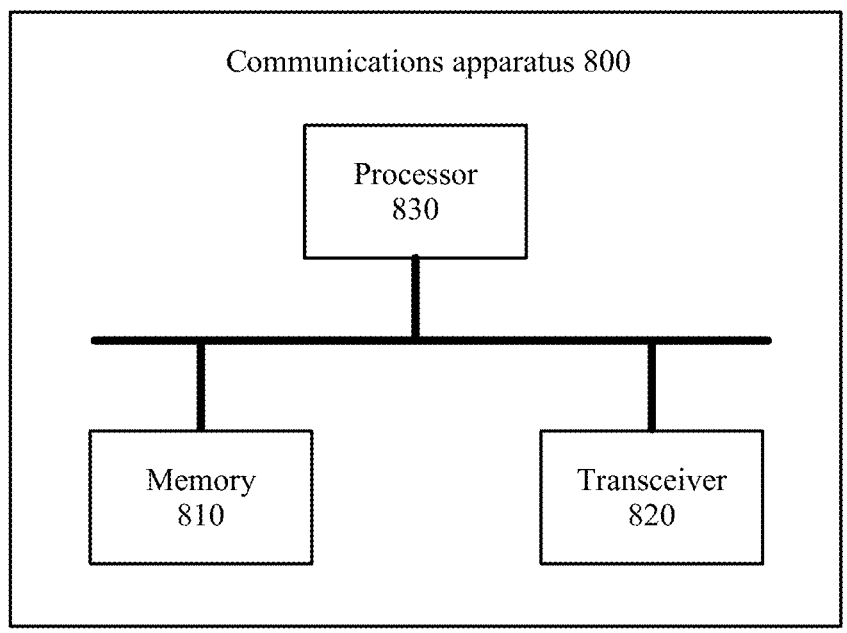
FIG. 20 is a schematic block diagram of a wireless communications device according to an embodiment of this application.

FIG. 20 is a schematic block diagram of a communications apparatus 800 according to an embodiment of this application. The communications apparatus 800 includes:

a memory 810, configured to store program code;

a transceiver 820, configured to communicate with another device; and a processor 830, configured to execute the program code stored in the memory 810.

Optionally, when the code is executed, the processor 830 may enable a receive-end device in the method 200 to perform the operations. For brevity, details are not described herein again. In this case, the communications apparatus 800 may be a terminal device. The transceiver 820 is configured to receive and send a specific signal after being driven by the processor 830.

Optionally, when the code is executed, the processor 830 may further enable a receive-end device in the method 300 to perform the operations. For brevity, details are not described herein again. In this case, the communications apparatus 800 may be a terminal device.

Optionally, when the code is executed, the processor 830 may further enable a receive-end device in the method 400 to perform the operations. For brevity, details are not described herein again. In this case, the communications apparatus 800 may be a terminal device.

In addition, this application further provides a chip system. The chip system includes a processor, configured to implement the foregoing method embodiments. In a possible design, the chip system further includes a memory, and the memory is configured to store a computer program instruction for the processor to perform a corresponding procedure and/or operation in any method embodiment of this application. The chip system may include a chip, or may include a chip and another discrete device.

In addition, this application further provides a computer program product. The computer program product includes computer program code. When the computer program code runs on a computer, the computer is enabled to perform the method in any method embodiment of this application.

It should be understood that, in this embodiment of this application, the processor 830 may be a central processing unit (CPU); or the processor 830 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

The memory 810 may include a read-only memory and a random access memory, and provide an instruction and data to the processor 830. A part of the memory 810 may further include a non-volatile random access memory. For example, the memory 810 may further store device type information.

The transceiver 820 may be configured to implement a signal sending and receiving function, such as a frequency modulation and demodulation function or an up-conversion and down-conversion function.

In an implementation process, at least one step in the foregoing methods may be completed by using an integrated logic circuit of hardware in the processor 830, or the at least one step is completed by the integrated logic circuit driven by a software-form instruction. Therefore, the communications apparatus 800 may be a chip or a chip group. The steps of the methods disclosed with reference to embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, a register, or the like. The storage medium is located in the memory, and the processor 830 reads information in the memory and completes the steps in the foregoing methods in combination with hardware of the processor 830. To avoid repetition, details are not described herein again.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, units and algorithm steps described with reference to the examples described in the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing described system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on an actual requirement to achieve objectives of solutions of the embodiments.

In addition, functional units in embodiments of this application may be integrated into one processing unit, or each of the units may exist alone physically, or at least two units are integrated into one unit.

When functions are implemented in the form of a software functional unit and sold or used as an independent product, the functions may be stored in a computer-readable storage medium. Based on such an understanding, technical solutions of this application may be implemented in a form of a software product. The computer software product is stored in a storage medium, and includes several instructions for instructing a computer device (which may be a personal computer, a server, a network device, or the like) to perform all or some of the steps of the methods described in embodiments of the present invention. The foregoing storage medium includes: any medium that can store program code, such as a Universal Serial Bus (USB) flash drive, a removable hard disk, a read-only memory (ROM), a random access memory (RAM), a magnetic disk, or an optical disc.

The foregoing descriptions are merely exemplary implementations of this application, but are not intended to limit the protection scope of this application. Any variation or replacement readily figured out by a person skilled in the art within the technical scope disclosed in the present application may fall within the protection scope of the present invention. The protection scope of this application shall be subject to the protection scope of the claims.

What is claimed is:

1. A wireless communication method, comprising:
   obtaining, by a terminal device, feature information of a first air interface format, wherein the feature information of the first air interface format comprises a subcarrier spacing;
   receiving, by the terminal device, time length information of a first timer; and
   starting, by the terminal device, the first timer when a second timer expires;
   wherein a configuration of the first timer is based on the feature information of the first air interface format and the time length information of the first timer, wherein different first air interface formats correspond to different time lengths of the first timer;
   wherein the second timer is an uplink hybrid automatic repeat request (HARQ) round trip time timer or a downlink HARQ round trip time timer, and the second timer is started when first transmission data is sent or received; and
   wherein the first timer is an uplink retransmission timer or a downlink retransmission timer.

2. The method according to claim 1, wherein the first timer corresponds to a duration for the terminal device to monitor a downlink control channel to obtain control information that indicates retransmission of first transmission data.

3. The method according to claim 1, wherein the second timer corresponds to a duration in which the downlink control channel is not monitored.

4. The method according to claim 1, wherein the feature information of the first air interface format further comprises a cyclic prefix length.

5. The method according to claim 1, wherein a unit of the first timer corresponds to a slot or mini-slot corresponding to the first air interface format.

6. The method according to claim 1, wherein a time length of the second timer is based on feature information of a second air interface format.

7. A wireless communications device, comprising at least one processor and a memory coupled to the at least one processor, the at least one processor being configured to:
   obtain feature information of a first air interface format, wherein the feature information of the first air interface format comprises a subcarrier spacing;
   receive time length information of a first timer; and
   start the first timer when a second timer expires;
   wherein a configuration of the first timer is based on the feature information of the first air interface format and the time length information of the first timer, wherein different first air interface formats correspond to different time lengths of the first timer;
   wherein the second timer is an uplink hybrid automatic repeat request (HARQ) round trip time timer or a downlink HARQ round trip time timer, and the second timer is started when first transmission data is sent or received; and
   wherein the first timer is an uplink retransmission timer or a downlink retransmission timer.

8. The device according to claim 7, wherein the first timer corresponds to a duration for the terminal device to monitor a downlink control channel to obtain control information that indicates retransmission of first transmission data.

9. The device according to claim 7, wherein the second timer corresponds to a duration in which the downlink control channel is not monitored.

10. The device according to claim 7, wherein the feature information of the first air interface format further comprises a cyclic prefix length.

11. The device according to claim 7, wherein a unit of the first timer corresponds to a slot or mini-slot corresponding to the first air interface format.

12. The device according to claim 7, wherein a time length of the second timer is based on feature information of a second air interface format.

13. A non-transitory computer-readable storage medium, comprising a program, wherein the program, when executed by a processor, causes the following steps to be performed:
obtaining feature information of a first air interface format, wherein the feature information of the first air interface format comprises a subcarrier spacing;
receiving time length information of a first timer; and
starting the first timer when a second timer expires;
wherein a configuration of the first timer is based on the feature information of the first air interface format and the time length information of the first timer, wherein different first air interface formats correspond to different time lengths of the first timer;
wherein the second timer is an uplink hybrid automatic repeat request (HARQ) round trip time timer or a downlink HARQ round trip time timer, and the second timer is started when first transmission data is sent or received; and
wherein the first timer is an uplink retransmission timer or a downlink retransmission timer.

14. The non-transitory computer-readable storage medium according to claim 13, wherein the first timer corresponds to a duration for the terminal device to monitor a downlink control channel to obtain control information that indicates retransmission of first transmission data.

15. The non-transitory computer-readable storage medium according to claim 13, wherein the second timer corresponds to a duration in which the downlink control channel is not monitored.

16. The non-transitory computer-readable storage medium according to claim 13, wherein the feature information of the first air interface format further comprises a cyclic prefix length.

17. The non-transitory computer-readable storage medium according to claim 13, wherein a unit of the first timer corresponds to a slot or mini-slot corresponding to the first air interface format.

18. The non-transitory computer-readable storage medium according to claim 13, wherein a time length of the second timer is based on feature information of a second air interface format.

* * * * *